Feb. 25, 1947.  H. O. NAUMANN  2,416,534
APPARATUS FOR TREATING YARN
Filed June 3, 1943  20 Sheets-Sheet 1

Inventor
Herbert O. Naumann
By Rudolf S. Bley
Attorney

Inventor
Herbert O. Naumann
By Rudolph S. Bley
Attorney

Feb. 25, 1947. H. O. NAUMANN 2,416,534
APPARATUS FOR TREATING YARN
Filed June 3, 1943 20 Sheets-Sheet 3

Inventor
Herbert O. Naumann
By Rudolph S. Bley
Attorney

Feb. 25, 1947. H. O. NAUMANN 2,416,534
APPARATUS FOR TREATING YARN
Filed June 3, 1943 20 Sheets-Sheet 6

Inventor
Herbert O. Naumann
By Rudolph S. Bley
Attorney

Feb. 25, 1947. H. O. NAUMANN 2,416,534
APPARATUS FOR TREATING YARN
Filed June 3, 1943 20 Sheets-Sheet 7
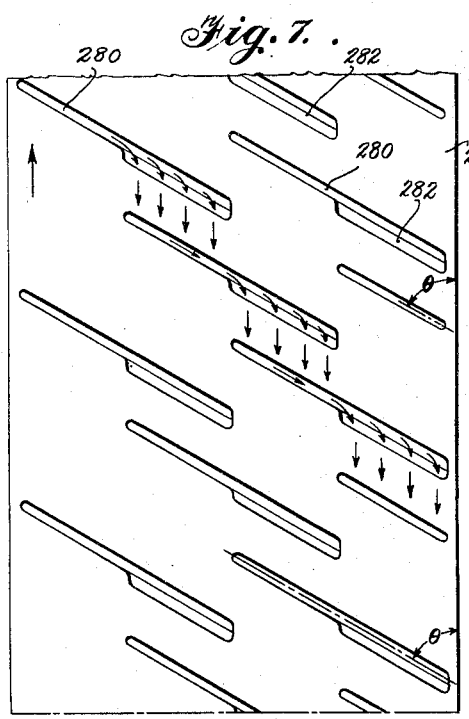
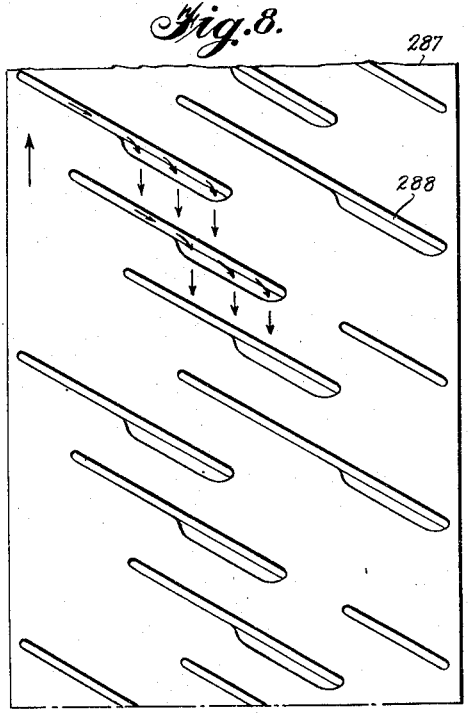
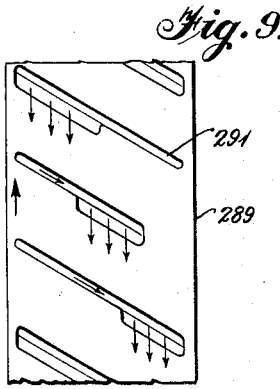
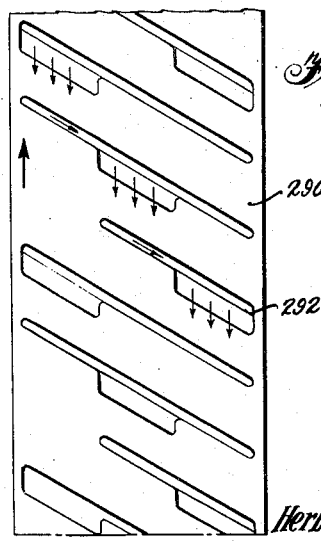
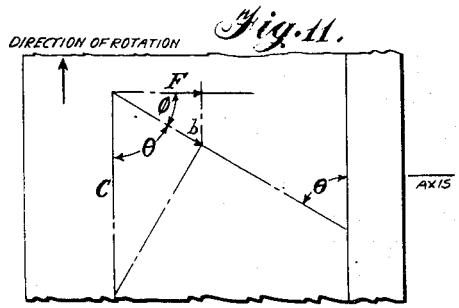
Inventor
Herbert O. Naumann
By Rudolph S. Bley
Attorney

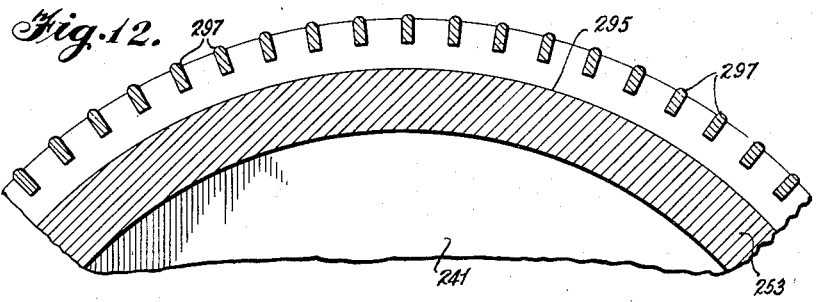
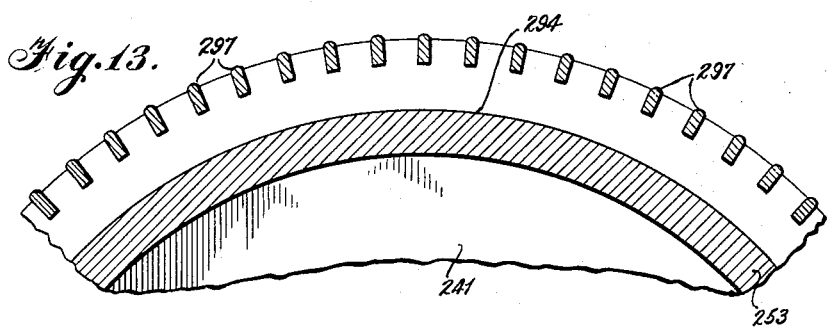
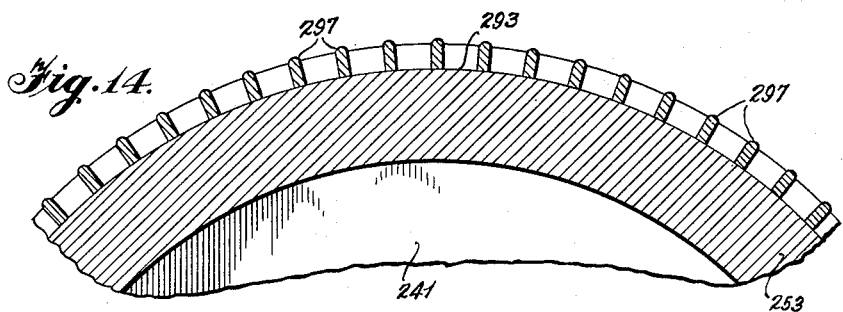
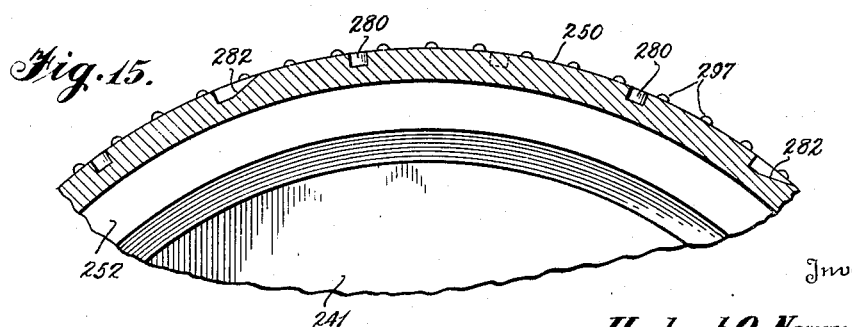

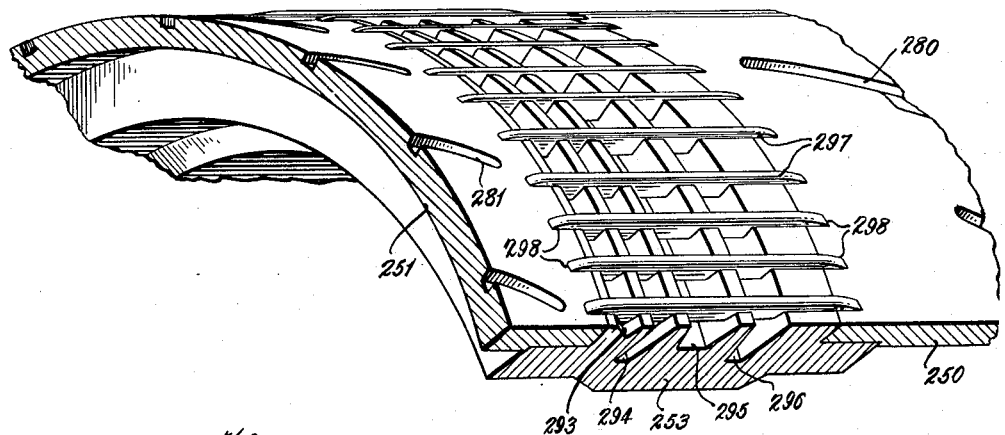
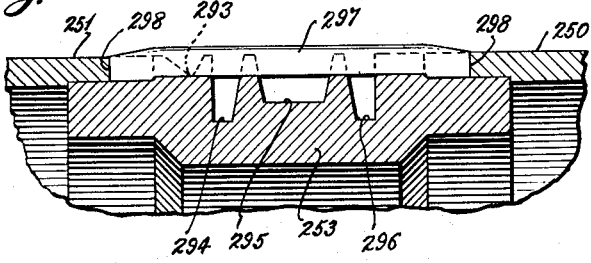
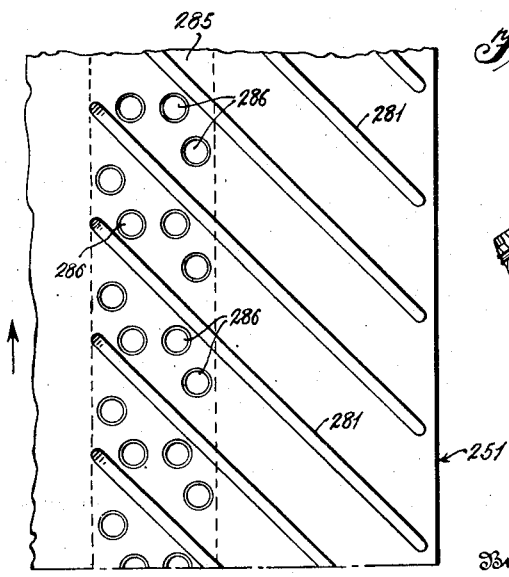
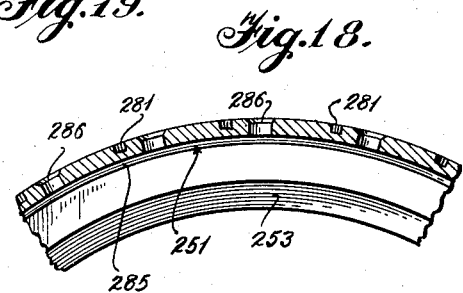

Feb. 25, 1947.  H. O. NAUMANN  2,416,534
APPARATUS FOR TREATING YARN
Filed June 3, 1943   20 Sheets-Sheet 10

Inventor
Herbert O. Naumann
By Rudolph S. Bley
Attorney

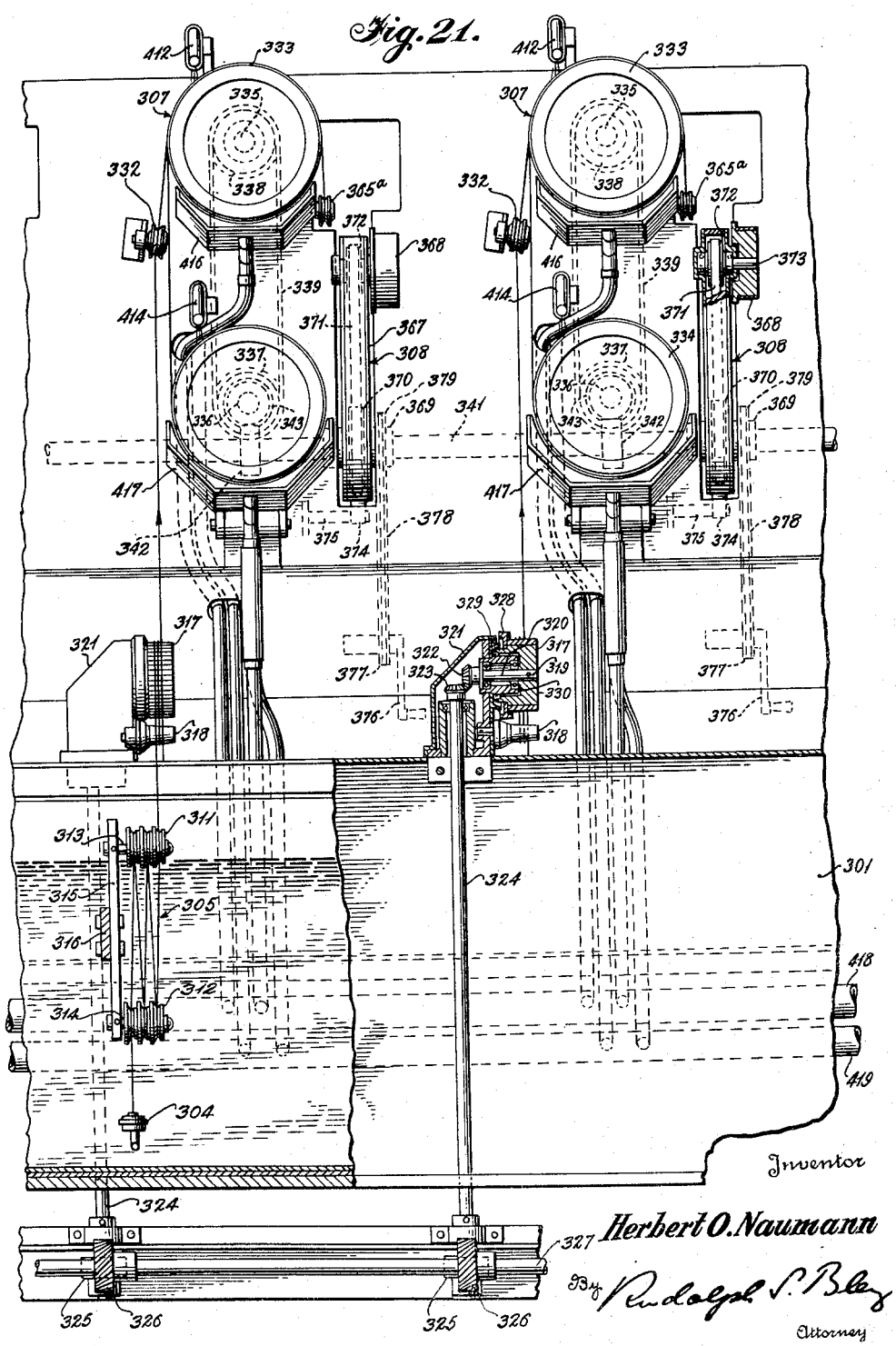

Feb. 25, 1947.     H. O. NAUMANN     2,416,534
APPARATUS FOR TREATING YARN
Filed June 3, 1943     20 Sheets-Sheet 12
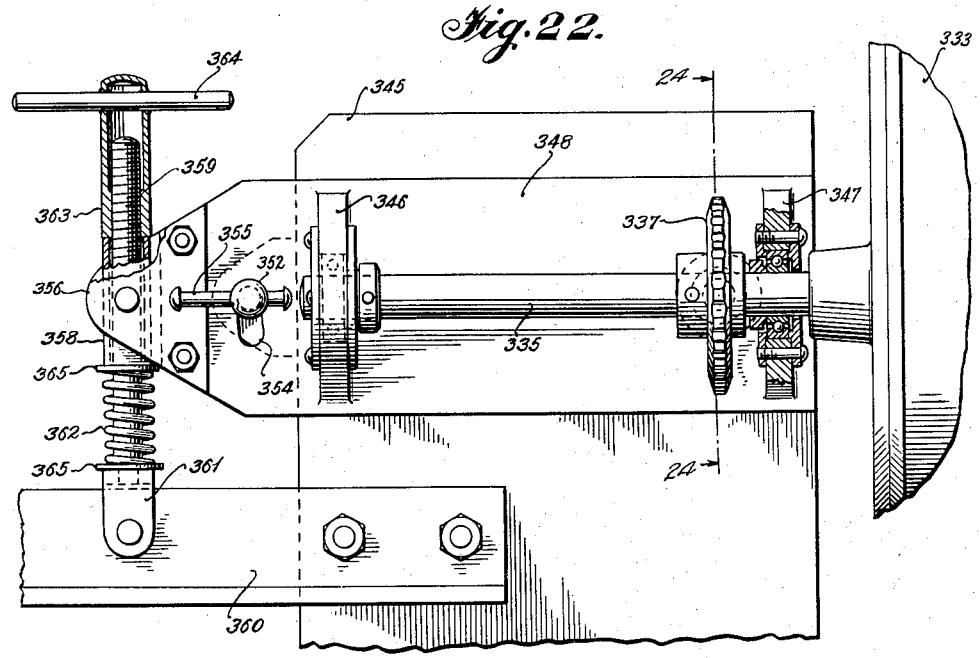
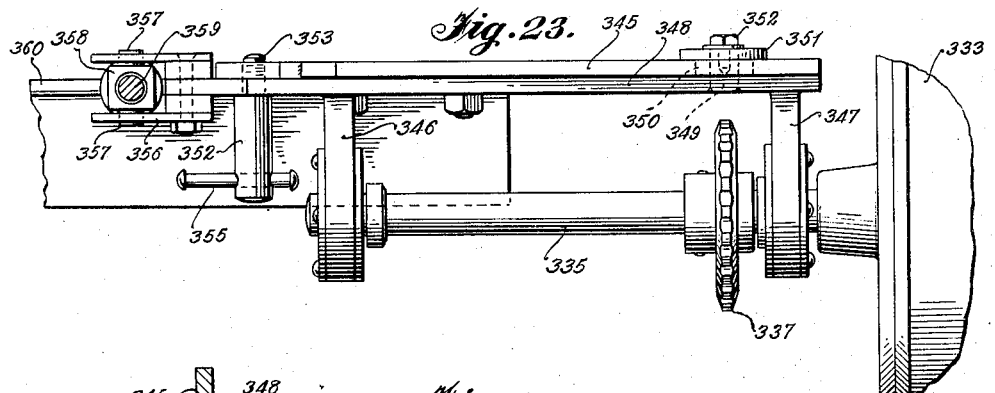
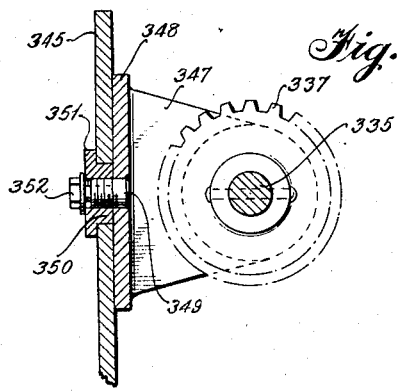
Inventor
Herbert O. Naumann
By Rudolph S. Bley
Attorney

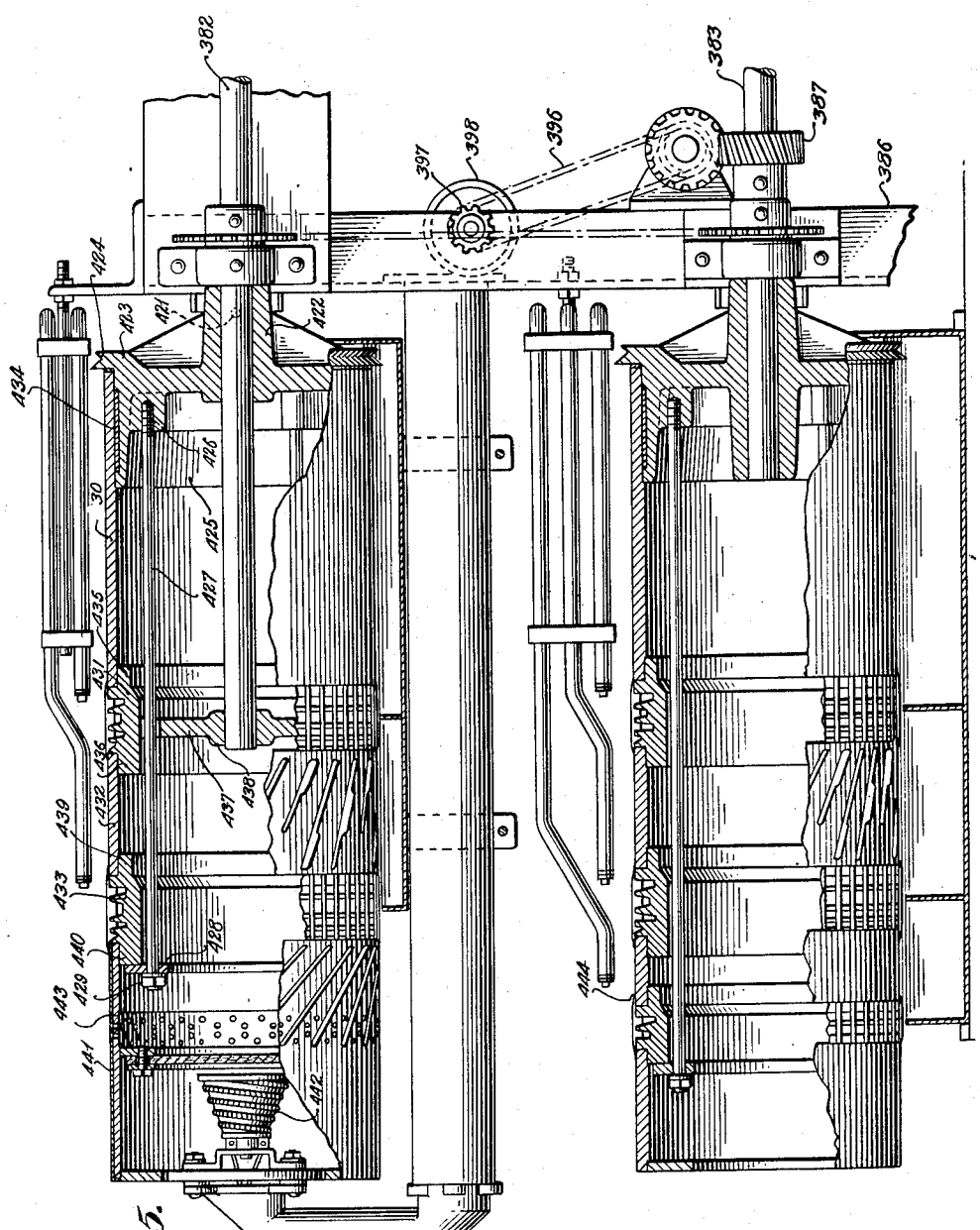

Feb. 25, 1947. H. O. NAUMANN 2,416,534
APPARATUS FOR TREATING YARN
Filed June 3, 1943 20 Sheets-Sheet 14

Inventor
Herbert O. Naumann
By Rudolph S. Bley
Attorney

Inventor
Herbert O. Naumann
By Rudolph S. Bley
Attorney

Feb. 25, 1947. H. O. NAUMANN 2,416,534
APPARATUS FOR TREATING YARN
Filed June 3, 1943 20 Sheets-Sheet 16

Inventor
Herbert O. Naumann
By Rudolph S. Bley
Attorney

Feb. 25, 1947.  H. O. NAUMANN  2,416,534
APPARATUS FOR TREATING YARN
Filed June 3, 1943  20 Sheets-Sheet 17

Inventor
Herbert O. Naumann
By Rudolph S. Bley
Attorney

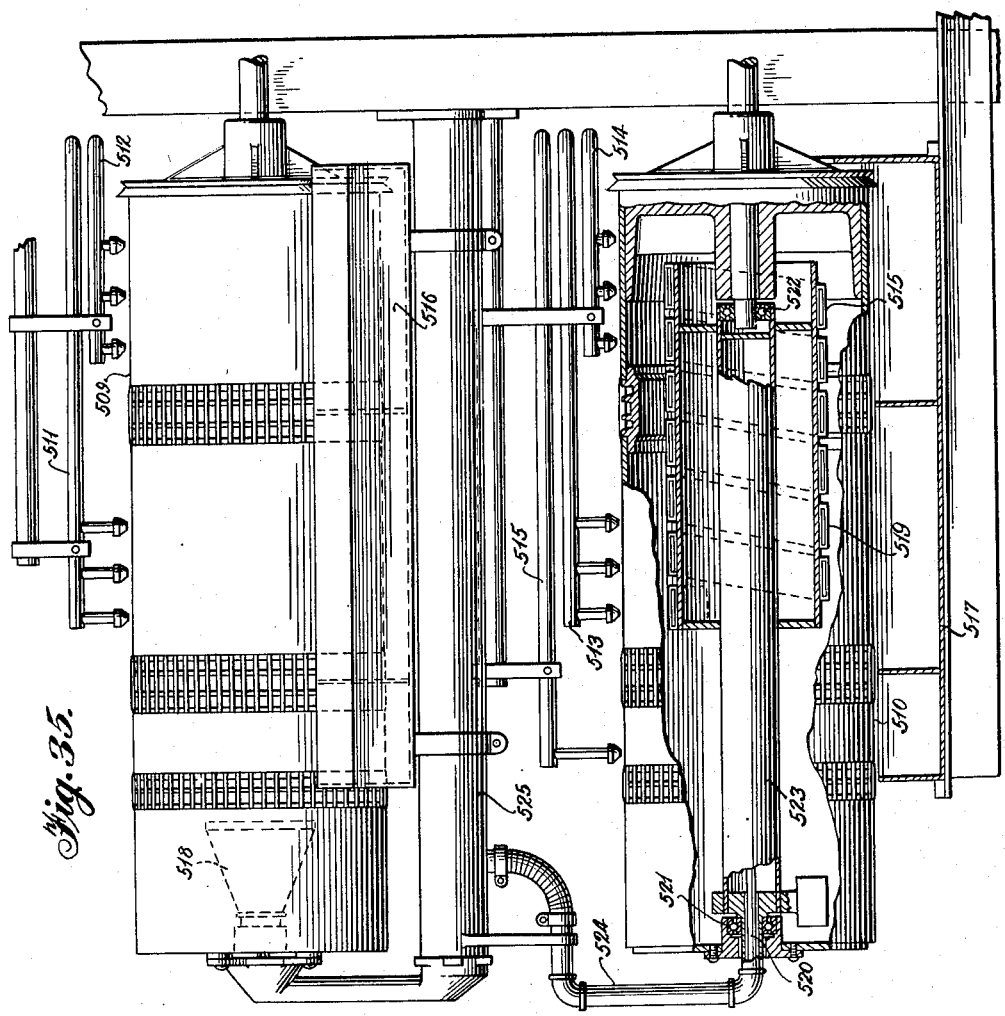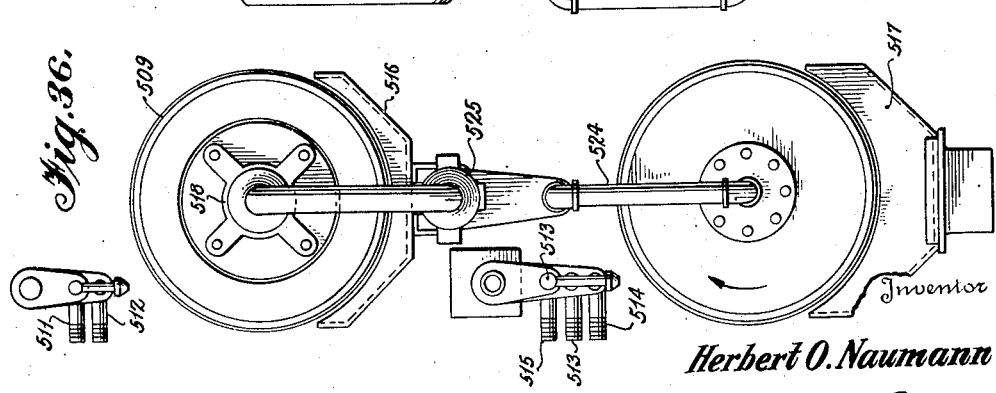

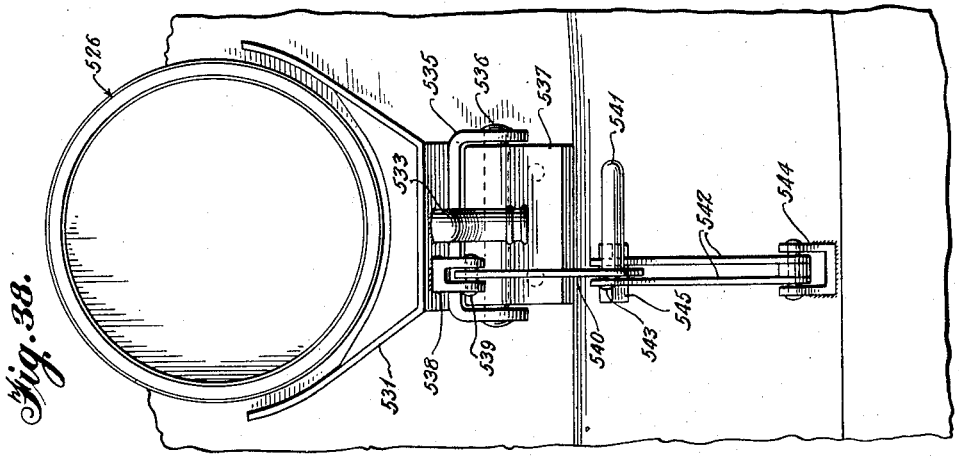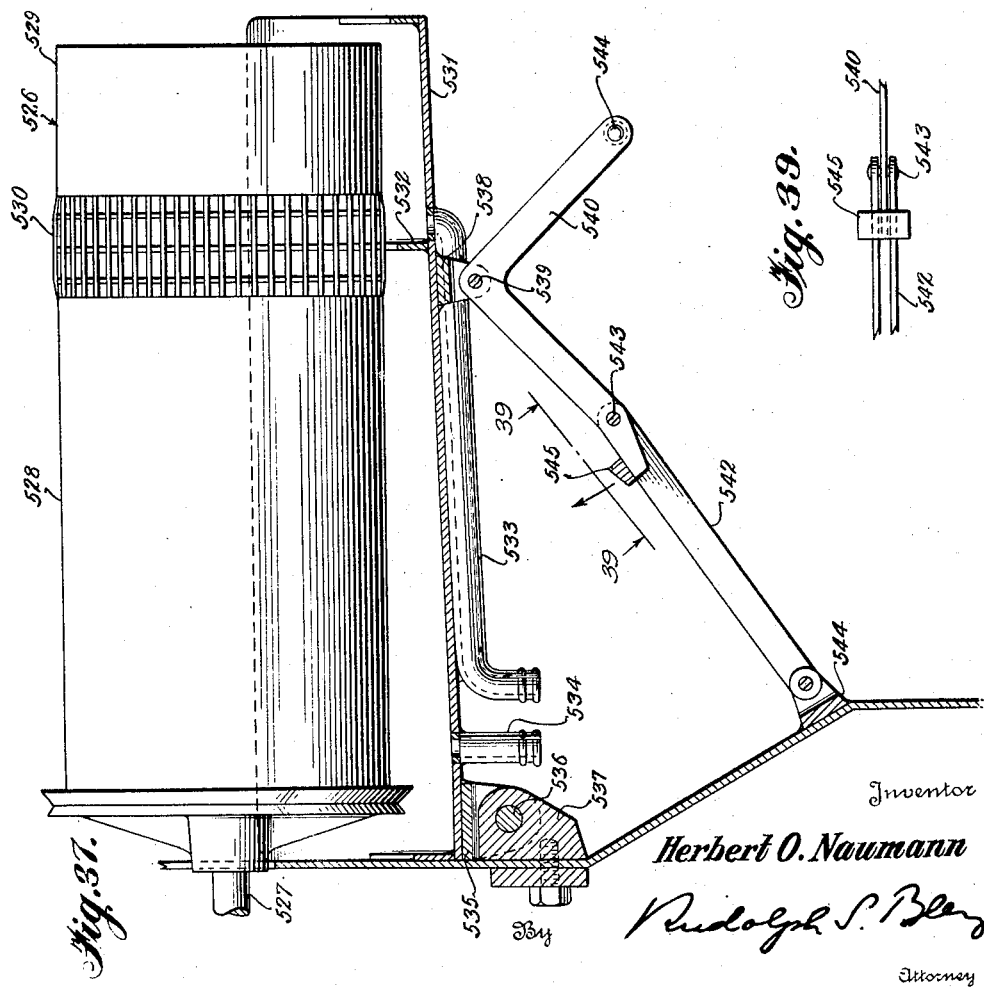

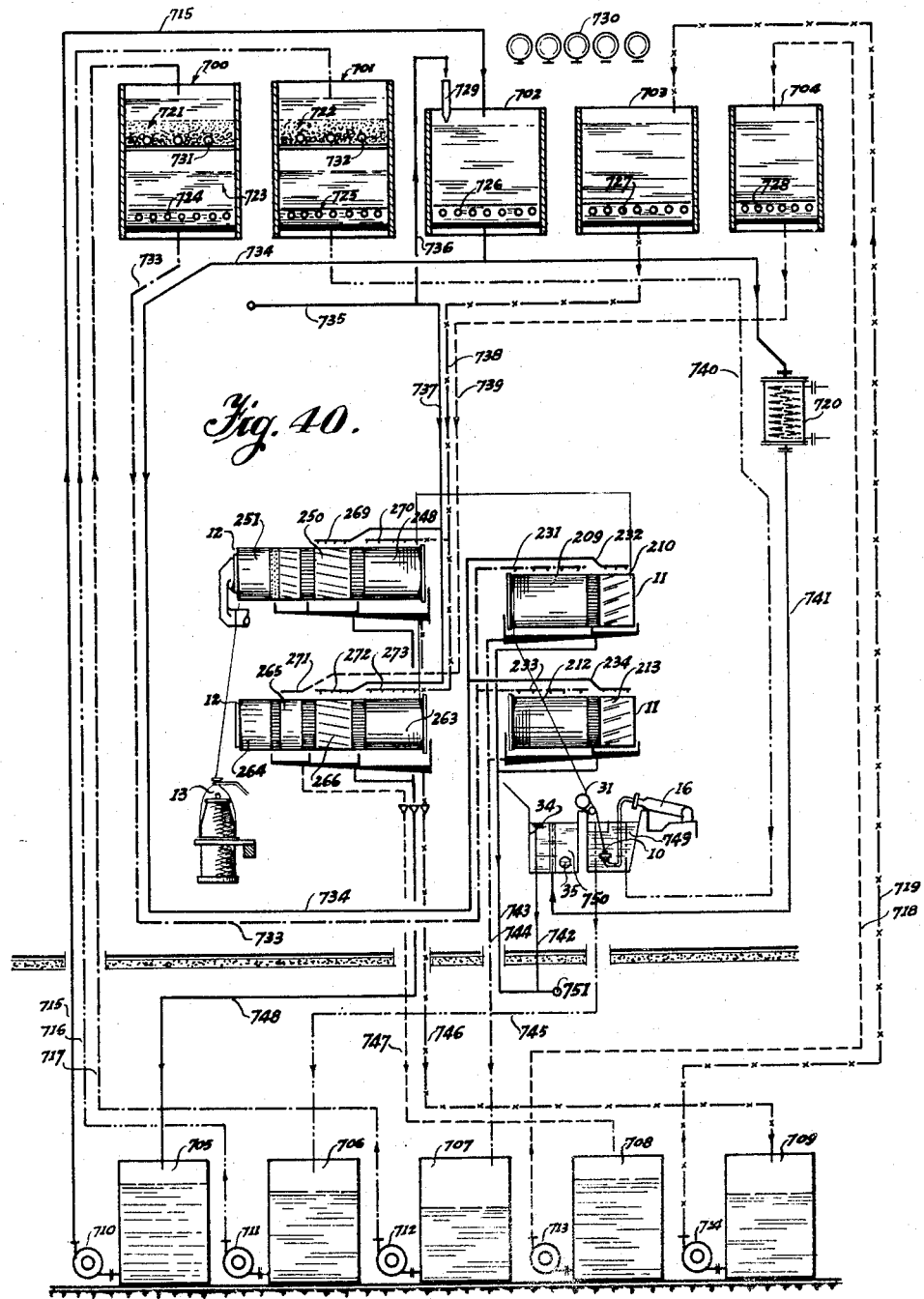

Patented Feb. 25, 1947

2,416,534

UNITED STATES PATENT OFFICE 2,416,534

APPARATUS FOR TREATING YARN

Herbert O. Naumann, Englewood, N. J., assignor to North American Rayon Corporation, New York, N. Y., a corporation of Delaware Application June 3, 1943, Serial No. 489,551

11 Claims. (Cl. 68—205)

This invention relates to the treatment of thread, and is more particularly concerned with apparatus for the purification and drying of thread of synthetic origin.

Generally speaking, the wet spinning of synthetic thread embodies the extrusion of a spinning solution into a spin bath, the collection of the thread thus formed into packages either in the form of cakes, spool packages, or skeins, and then the subsequent liquid treatment and sometimes drying of the thread while it remains in package form.

Due to the fact that such packages comprise superposed and often tightly wound layers of thread, it becomes necessary, in order to insure that each individual thread layer receives proper treatment, to force liquid through the package by means of pressure and/or vacuum.

The primary object of this invention is to facilitate the treatment of synthetic thread with liquids. Another object is to expose uniformly each portion of a thread to treating fluids, under definitely controlled conditions and for adequate periods of time.

It is a further object of this invention to produce finished wet spun threads, fully aftertreated, dried, sized and twisted to a controlled extent, characterized by economy in the amount of chemicals used, in the control in the amount of their temperature, of space occupied, and in man hours per pound of thread produced. The above and other objects may be attained by employing this invention, which embodies among its features directing a thread from a suitable thread source onto and around a thread-advancing thread-store device and applying treating liquids to separate zones of the thread-advancing thread-store device, by the action of the elements of which the treating liquids are distributed as films in their respective zones, and the thread is advanced in the form of a single layer of helices travelling progressively through the zones and in contact with the films.

Other advantages of this invention will be apparent upon consideration of the following detailed description thereof in conjunction with the annexed drawings wherein:

Figures 7, 8, 9 and 10 are developments illustrating the manner of disposition and function of different types of grooves cut in the surfaces of certain cylinders of thread-storage, thread-advancing units constructed according to this invention;

Figure 11 is a mathematical illustration of the theory of operation of the grooves cut in the surface of certain cylinders of thread-storage, thread-advancing units constructed according to this invention;

Figure 12 is a view in section taken along the line 12—12 of Figure 6;

Figure 13 is a view in section taken along the line 13—13 of Figure 6;

Figure 14 is a view in section taken along the line 14—14 of Figure 6;

Figure 15 is a view in section taken along the lines 15—15 of Figure 6;

Figure 16 is a perspective view, to an enlarged scale, of a portion of the upper roller of the thread-storage, thread-advancing unit of Figure 6, illustrating the structural details of a liquid separation zone;

Figure 17 is a vertical section to an enlarged scale of a portion of the upper roller of the thread-storage, thread-advancing device of Figure 6, showing in detail the connection between sections of a roller and the structure of the liquid discharge zone between adjacent sections;

Figure 18 is a development of the cylindrical surface constituting a portion of the cooling zone of the upper roller of the thread-storage, thread-advancing device of Figure 6;

Figure 19 is a fragmentary view in section of the cylinder developed in Figure 18;

Figure 21 is a view in side elevation illustrating a portion of the right or spinning side of the machine of Figure 20, one godet driving connection being shown in section;

Figure 22 is a view partially in section and partially in side elevation of an adjusting device for changing the angular position of the upper roller on the spinning side of the machine shown in Figure 20;

Figure 23 is a top plan view of the device of Figure 22, the operating handle being removed for convenience in illustration;

Figure 24 is a view taken along line 24—24 of Figure 22;

Figure 25 is a view partially in side elevation and partially in vertical section of a thread-storage, thread-advancing device of the type with which the left or finishing side of the spinning machine of Figure 20 is equipped;

Figure 35 is a view partially in side elevation and partially in longitudinal section of a cantilever thread-storage, thread-advancing unit including temperature controlling means acting on the surface of the roller to which liquid treating media are applied;

Figure 36 is a view in elevation of the unsupported end of the unit of Figure 35;

Figure 37 is a view partially in side elevation and partially in longitudinal section of the lower roller of a thread-storage, thread-advancing unit illustrating a movable trough for the collection of used treading liquids;

Figure 38 is a view in elevation of the unsupported end of the roller of Figure 37;

Figure 39 is a plan view taken along the line 39—39 of Figure 37; and

Figure 40 is a chemical flow sheet showing a typical treating liquid supply and circulation system used in conjunction with a continuous spinning machine constructed according to this invention, in specific application to the construction of Figure 1.

Referring now in detail to Figures 1 to 4, inclusive, it will be seen that the spinning machine illustrated includes a number of spinning units, each consisting basically of a spinneret 10 and a pair of thread-storage, thread-advancing devices 11 and 12. On devices 11 and 12, the freshly formed thread is subjected to all required aftertreatments, whereupon it is concurrently twisted and collected on twisting spindle 13 in finished form. For convenience in illustration, all of the component units of a continuous spinning machine constructed according to the present invention have not been illustrated. It is contemplated, however, that a single machine include some 50 to 70 spinning units arranged in alignment as illustrated. While it will be increasingly evident upon consideration of the following description that this invention is adaptable to any type of wet spinning operation involving the preparation of a thread in the form of a hydrated colloid, the apparatus will be specifically discussed in conjunction with the manufacture of viscose rayon.

Figure 2:
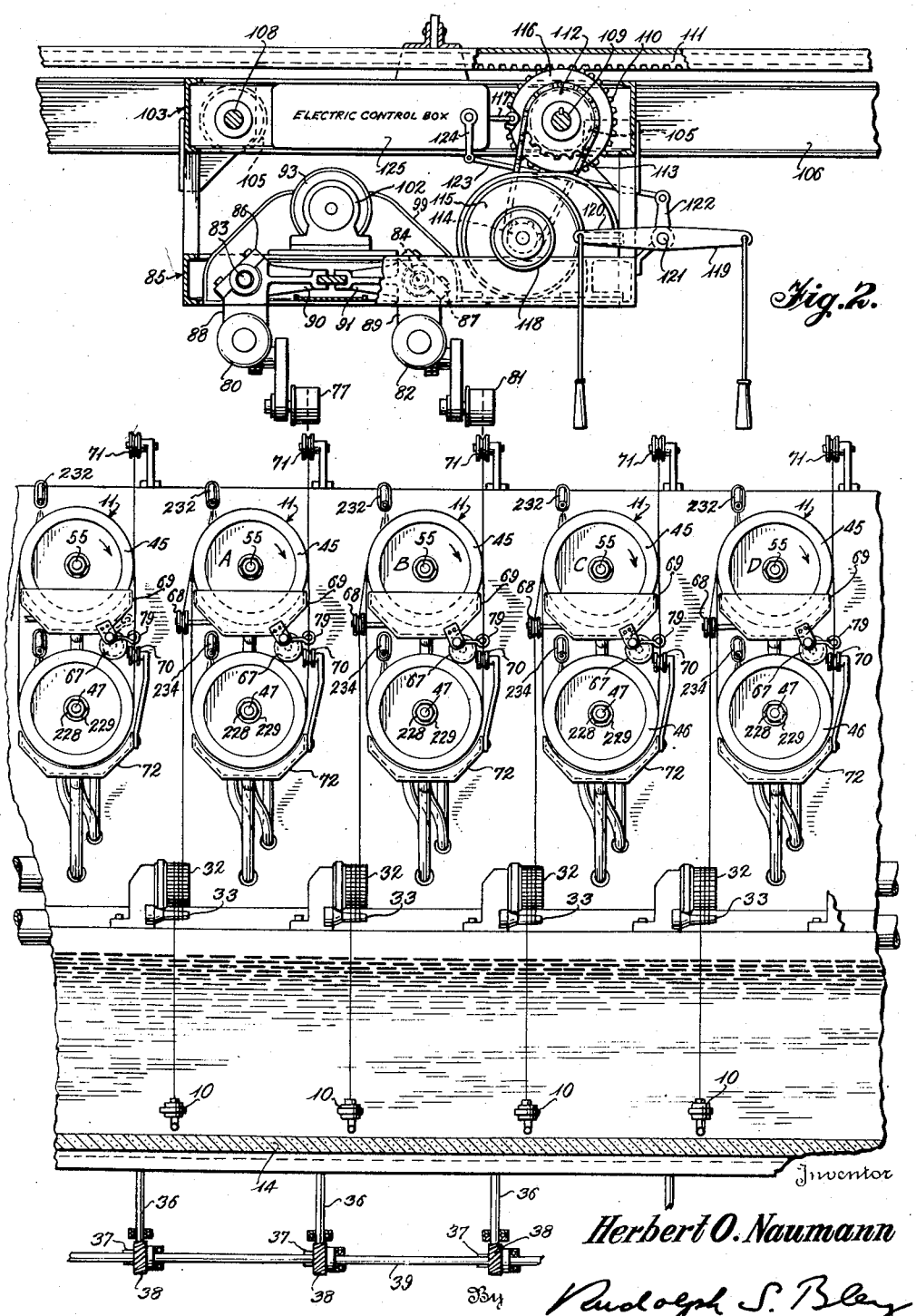
Figure 2 is a view in side elevation illustrating a portion of the right or spinning side of the machine of Figure 1.

Upon reference to Figure 2, it will be seen that all of the spinnerets 10 are disposed in a single common spin bath container 14 which extends for the full length of the machine. The spinnerets are mounted on the front wall of bath container 14 in the usual manner which permits individual removal of a spinneret in case of localized operating difficulty. A gear pump 15 is associated with each spinneret 10 serving to supply viscose solution under pressure to the spinneret through the usual filter 16. So that each spinneret will extrude a thread of like characteristics, all of the gear pumps 15 are driven from a common power source such as an electric motor 17, see Figure 4. Each pump 15 is provided with a gear 18 meshing with a gear 19, all of the latter being keyed to a common shaft 20, having on one end thereof a driving gear 21. The rotor shaft of motor 17 carries a sheave 22 connected by a belt 23 with a sheave 24 keyed on a shaft 25, which, additionally, carries a driving gear 26. A gear train consisting of gears 27, 28, 29 and 30 serves to connect gear 26 and gear 21 so as to establish a driving connection to the various pumps 15. It is apparent that, although, at any one speed of shaft 20, the delivery of all pumps 15 will be uniform, the speed of shaft 20 may be varied by substituting gears of different diameters in gear train 27, 28, 29, 30 to bring about changes in denier on the part of the thread extruded through spinnerets 10 by alteration in pump pressure.

At spaced points along the length of the rear wall of spin bath container 14, godets 31 are provided, each of these consisting of a driven wheel 32 and a freely rotatable one 33. The thread issuing from each spinneret 10 is first led around the respective godet 31 and then through a bath trough 34 structurally similar to trough 14, but adapted to contain hot water or hot acid depending upon the chemical requirements in any particular instance. In trough 34 the thread is passed around a freely rotatable guide 35 and then led to thread-storage, thread-advancing unit 11. It will be understood that the by-passing or use of trough 34 is entirely a matter of the chemistry of thread treatment since, in a mechanical sense, the thread may be led with equal ease directly from godet 31 to thread-storage, thread-advancing unit 11 as illustrated by the dot and dash lines in Fig. 1. Since the driven wheel 32 of each godet 31 is connected with a vertical shaft 36 having a gear 37 attached at the lower end thereof and since all gears 37 are driven from similar gears 38 spaced along shaft 39, it is evident that all the godets 31 will have the same takeup or peripheral speed derived from a common source. Since the spinning machine of the present invention is adaptable to the manufacture of threads of widely varying characteristics, it is evident that the amount of stretch to be imparted to the thread in any particular instance may also vary. For this reason, shaft 39 is connected through gear 40 to gear 41 on the delivery side of a connoid drive variable speed transmission 42 of any conventional type. This transmission is driven from a gear 43 keyed on shaft 25 through a gear 44. Since motor 17 drives shaft 25, it is apparent that godets 31 and pumps 15 are driven from a common power source although the speed of each is independently adjustable. From the godet 31, around the wheels of which the thread is wound several times to prevent slipping, each thread is led to its respective thread-storage, thread-advancing unit 11 either directly or through bath trough 34. As can be seen in the drawings, each unit 11 is comprised of two generally horizontally extending rollers 45 and 46.

Although rollers 45 and 46 both extend generally horizontally, it is the usual practice to dispose the axis of roller 46 in a truly horizontal direction while that of roller 45 is slightly inclined with respect to the horizontal so that the axes of the two rollers constituting a unit 11 will intersect. Thus, drive shaft 47, which extends axially from roller 46, is truly horizontal. This shaft is provided with a gear 48 which meshes with a gear 49 on a main drive shaft 50. As is the case with shaft 39, shaft 50 traverses the entire machine and is provided with a number of gears 49 corresponding to the number of rollers 46 which must be driven. A housing 51 surrounds gears 48 and 49 to protect the same from dirt and to provide support for bearings 52 and 53 in which shaft 47 is mounted. Housing 51 is supported in fixed position on a rigid frame member 54 held in position by any suitable means, not shown.

In connection with roller 45, a somewhat similar arrangement is employed, this roller being provided with an axial shaft 55 supported in bearings 56 and 57 in turn supported in a housing 58. Within housing 58 is a main drive shaft 59, extending for the entire length of the machine. Gears 60 are located at spaced points along this shaft, one meshing with each of gears 61 keyed to respective shafts 55.

Inasmuch as roller 45 does not extend in a truly horizontal direction, it is evident that this roller will, when properly disposed with respect to roller 46, cause thread wound in a coil around the two rollers to move axially of the unit. The theory of operation of two-roller thread-storage, thread-advancing units in the familiar one that thread drawn onto a roller will approach the same at a right angle to the direction of pull which is, of course, from the axis thereof. Thus, if roller 45 is slightly inclined with respect to the horizontal so that the axis thereof and that of roller 46 converge in the direction of their unsupported ends, thread wound around the two rollers will necessarily progress in the direction of convergence, i. e., toward the unsupported end of the unit. Since the spacing between adjacent connected coils is a function of the angle of convergence, it is also evident that the angle will determine the number of coils in unit 11 at any given time which, in turn, will control the duration of any treatment they may receive during passage thereover, assuming a constant linear speed. Thus, in the interest of accurate control of the duration of the treatments to be accomplished on unit 11, the position of the axis of roller 45 is rendered adjustable. To this end, each housing 58 is provided with an arcuate cover portion 62 which surrounds the upper portion of and rests upon a tubular support 63 which extends for the full length of the machine and serves to carry in like manner all of the housings 58. Since tubular support 63 will carry considerable load it is contemplated that at spaced points along its length it be suitably held from any convenient portion of the main frame of the machine. Shaft 59 is centered within tubular support 63, the latter having slots therein at spaced points along its length to permit meshing of gears 60 and 61, as may be seen in Figure 1.

Since all of the housings 58 float on tubular support 63, it is evident that they are rotatable thereabout. Similarly, since shaft 59 is centered in tubular support 63, it is equally evident that housing 58 may be rocked without interfering with the meshing of gears 60 and 61, the arcuate slots in the underside of tubular support 63 being of sufficient amplitude to permit considerable angular displacement of the housings 58. Because each housing 58 contains bearings 56 and 57 of shaft 55 any movement of the former about tubular support 63 will, of necessity, alter the angular disposition of the latter. The adjustments, of course, involve only a slight angular displacement of housing 58. This is effected by turning a shaft 64 having an end bearing 65 which is pivotally attached to a support 65a. Shaft 64 is provided with a thread area over which a nut is passed. This nut is pivotally attached between the depending arms of a bifurcated member 66 attached to the bottom of and extending downwardly from housing 58. The free end of shaft 64 is located adjacent a removable dust cap 67 and is adapted for engagement by a driving tool, operated from the front of the machine, such as a wrench. Thus, when shaft 64 is rotated, bifurcated member 66 through its nut is moved either closer to or further away from pivoted end bearing 65 of said shaft 64 depending upon the direction of rotation. Movement of bifurcated member 67 toward end bearing 65 tends to cause lowering of the unsupported end of roller 45, while movement in the other direction has the reverse effect. In either case, housing 58 is pivoted about tubular support 63 to change the angular position of shaft 55 and cylinder 45 concentrically mounted thereover. Since a screw is used to alter the position of shaft 55, it is evident that the adjustment is self-locking.

As illustrated in Figure 2, rollers 45 and 46 which constitute unit 11 are arranged in such a way that their axes lie in the same vertical plane but are convergent in the direction of the unsupported end of the unit. This is convenient from the standpoint of space economy, but is not essential. It is evident that the axial feeding theory will likewise obtain in any arrangement involving at least two rollers, the axes of which lie in intersecting planes.

It has been stated that the thread leaving the godet 31 is passed around rollers 45 and 46 in the form of spaced connected coils. The thread is first led onto the upper cylinder 45 of unit 11 over a guide roller 68, located adjacent the supported end of cylinder 45, said guide roller being supported on a bracket extending from collection trough 69 which underlies roller 45. It is led off of the opposite side of upper roller 45 of unit 11, under a guide roller 70 adjacent the free end of the unit, over a guide roller 71 and from thence to a thread-storage, thread-advancing unit 12. Guide roller 70 is supported on a bracket extending upwardly from collection trough 72 underlying roller 46, while guide roller 71 is supported on a bracket attached to a portion of the machine frame. The path of the thread to and from unit 11 is shown in Figure 1, the spaced coils wound around the two rollers being omitted for convenience in illustration, see Patent No. 2,194,470 to Hartmann et al.

Figure 4:
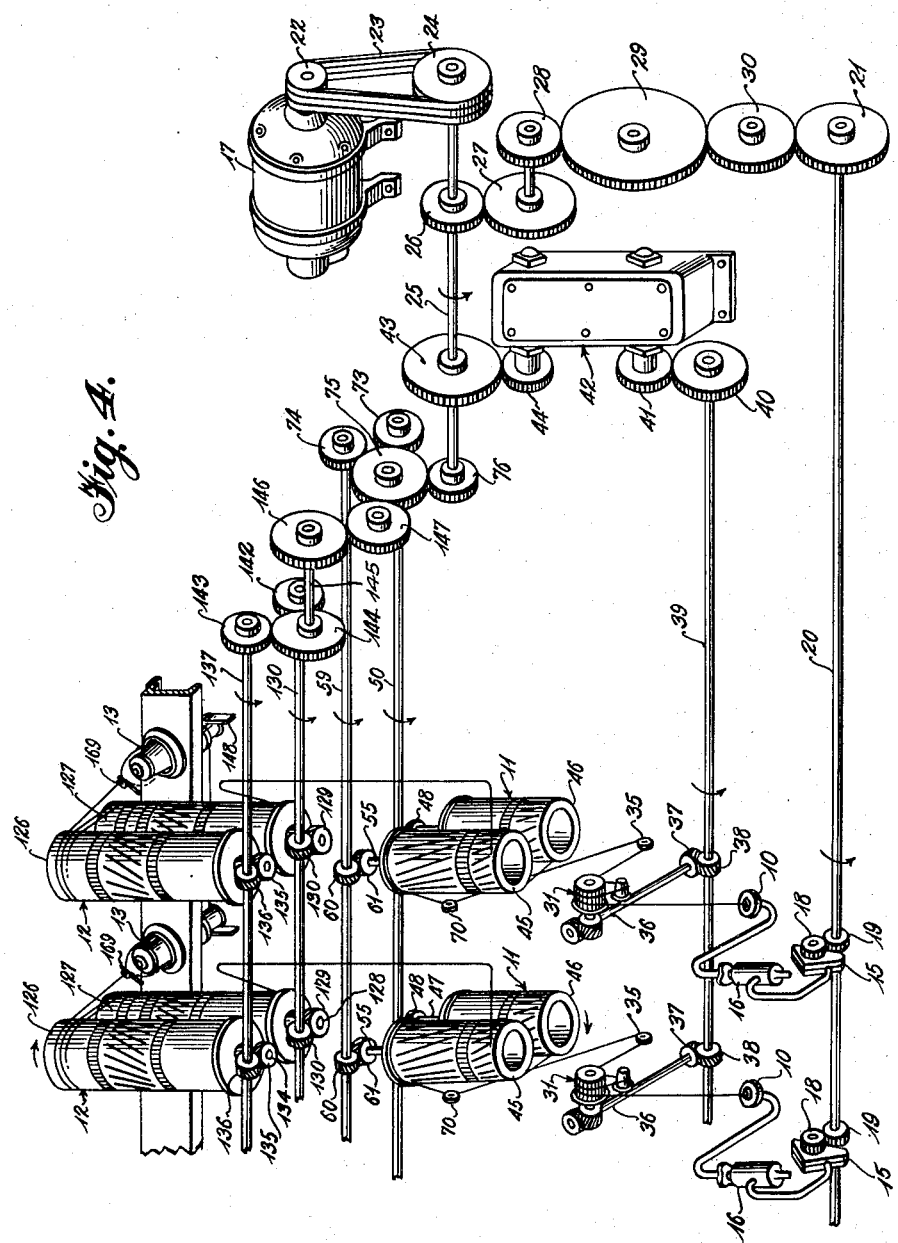
Figure 4 is a schematic perspective view of a typical driving arrangement for the spinning machine shown in Figures 1 to 3 inclusive.

In connection with the operation of unit 11, it is evident that shafts 47 and 55 of cylindrical rollers 45 and 46, respectively, must be driven in such a way that the two concentrically mounted cylinders of equal diameter have the same peripheral speed. This is best done by driving shafts 50 and 59 in synchronism from a common power source or by driving one shaft from the other. A convenient arrangement is shown in Figure 4 wherein shafts 50 and 59 are provided with pinions 73 and 74, respectively, of like size, both pinions meshing with a driving gear 75 driven from a gear 76 on main power shaft 25. While it is important that the peripheral speeds of rollers 45 and 46 be identical, it is evident that their takeup speed may be in excess of the delivery speed of the adjacent godet 31 so that stretching may occur between each unit 11 and its associated godet 31. Arrows in Figures 1, 2 and 4 serve to illustrate the direction of rotation of the rollers of unit 11 consistent with the cooperating structural features of those figures.

It will be recognized that the axial movement of the coils of thread from the supported toward the unsupported end of thread-storage, thread-advancing device 11 will occur only after that device has been threaded up. To do this it is, of course, first necessary to initiate rotation of shafts 50 and 59, which, through the intermediate gearing, cause rotation of shafts 47 and 55 and the rollers 46 and 45, carried thereby. This is done by starting motor 17, which action likewise causes operation of the pumps 15 as well as godets 31. At this stage, the spinning solution is extruded from each spinneret 10. The operator then grips the material issuing from the spinneret, pulls it up from the bath and winds the resulting thread several times around godet wheels 32 and 33, making enough convolutions to prevent slipping. The thread is then led from the godet, optionally through bath trough 34 around roller 35, and wound around rollers 45 and 46 in the form of a closed coil consisting of a number of contiguous or superimposed convolutions. This coil may be wound near the supported end of the unit 11 in which case it will move as a body to the unsupported end of the unit and the successively spun thread will be wound on in a position determined by the angular disposition of shaft 55. As the coil begins to move toward the unsupported end of unit 11, the operator drops the connecting thread into freely rotatable guide 68 so that each newly formed coil will be located directly adjacent the supported end of the unit. When the closed coil reaches the unsupported end of the device, the thread is broken between the coil and the spaced convolutions on the roller and the former is discarded. The resulting free end of thread is then led under roller 70 and over roller 71 and onto a rotating temporary collecting device 77. This device is moved bodily from the position shown in Figure 1 to a position overlying a guide 78 bearing a position with respect to thread-storage, thread-advancing unit 12 similar to the position of guide 71 with respect to unit 11. Unit 12 may then be threaded up in the manner just described in connection with unit 11.

Figure 1:
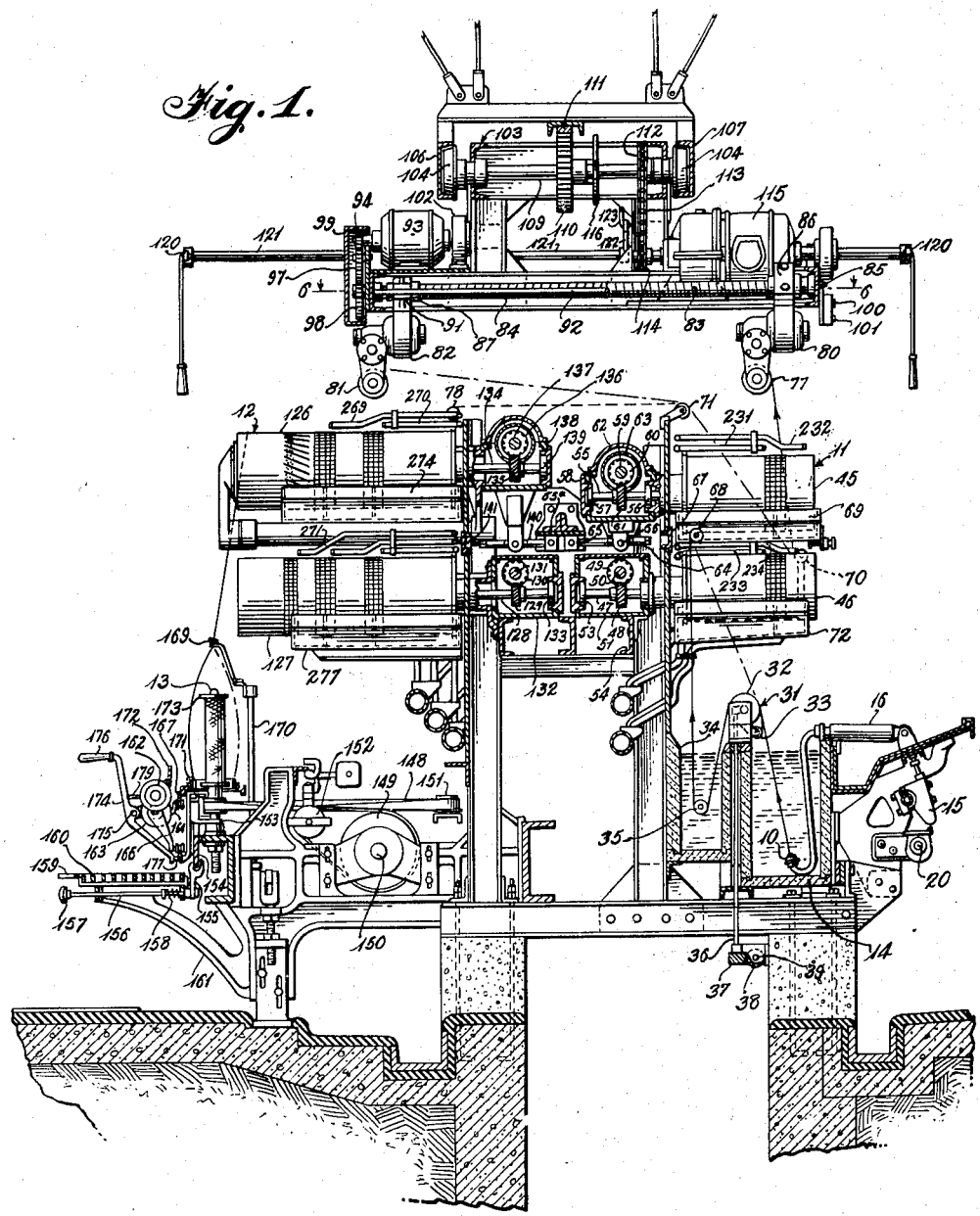
Figure 1 is an end view, partially in section, of a preferred type of continuous spinning machine constructed according to this invention.

Upon consideration of Figures 1 and 2, it will be seen that some difficulty may be encountered in winding a closed coil around rollers 45 and 46 near their supported ends because of bath trough 72. It is entirely possible to mount bath trough 72, however, in such a way that it may be tilted to a position sufficiently spaced from the roller so as to obviate interference with threading up as previously described; in this connection see Figure 37 to be hereinafter more fully described. The tilting of trough 72, while of convenience in some installations, is in no sense essential.

After thread-storage, thread-advancing unit 11 has been threaded up, it has been stated that the thread is carried from a point adjacent the free end of that unit to a point adjacent the supported end of thread-storage, thread-advancing unit 12 so that the latter may be threaded up in the manner previously described. This movement is effected by leading the free end of thread from thread-storage, thread-advancing unit 11 to a small rotating cylinder 77 constituting a temporary collecting device. Collecting device 77 is supported by and driven through suitable gearing from a motor 80. Thus, the free end of thread is wound around rotating temporary collecting device 77, and motor 80, with the temporary collecting device, is bodily moved from right to left as viewed in Figure 1 so that temporary collecting device 77 is positioned adjacent the supported end of thread-storage, thread-advancing unit 12.

So that a plurality of adjacent pairs of thread-storage, thread-advancing units may be threaded up with maximum convenience, another small cylindrical temporary collecting device 81 is disposed in horizontally offset position with respect to device 77 a distance equal to the space between the axes of adjacent units. Device 81 is supported and driven from a motor 82 of structure and functional characteristics similar to motor 80. Upon reference to Figures 1 and 5, it can be seen that collecting devices 77 and 81 are normally disposed on opposite sides of the machine. Thus, when collecting device 77 is overlying a thread-storage, thread-advancing device 11, temporary collecting device 81 is in a similar position over an adjacent thread-storage, thread-advancing device 12.

Figure 3:
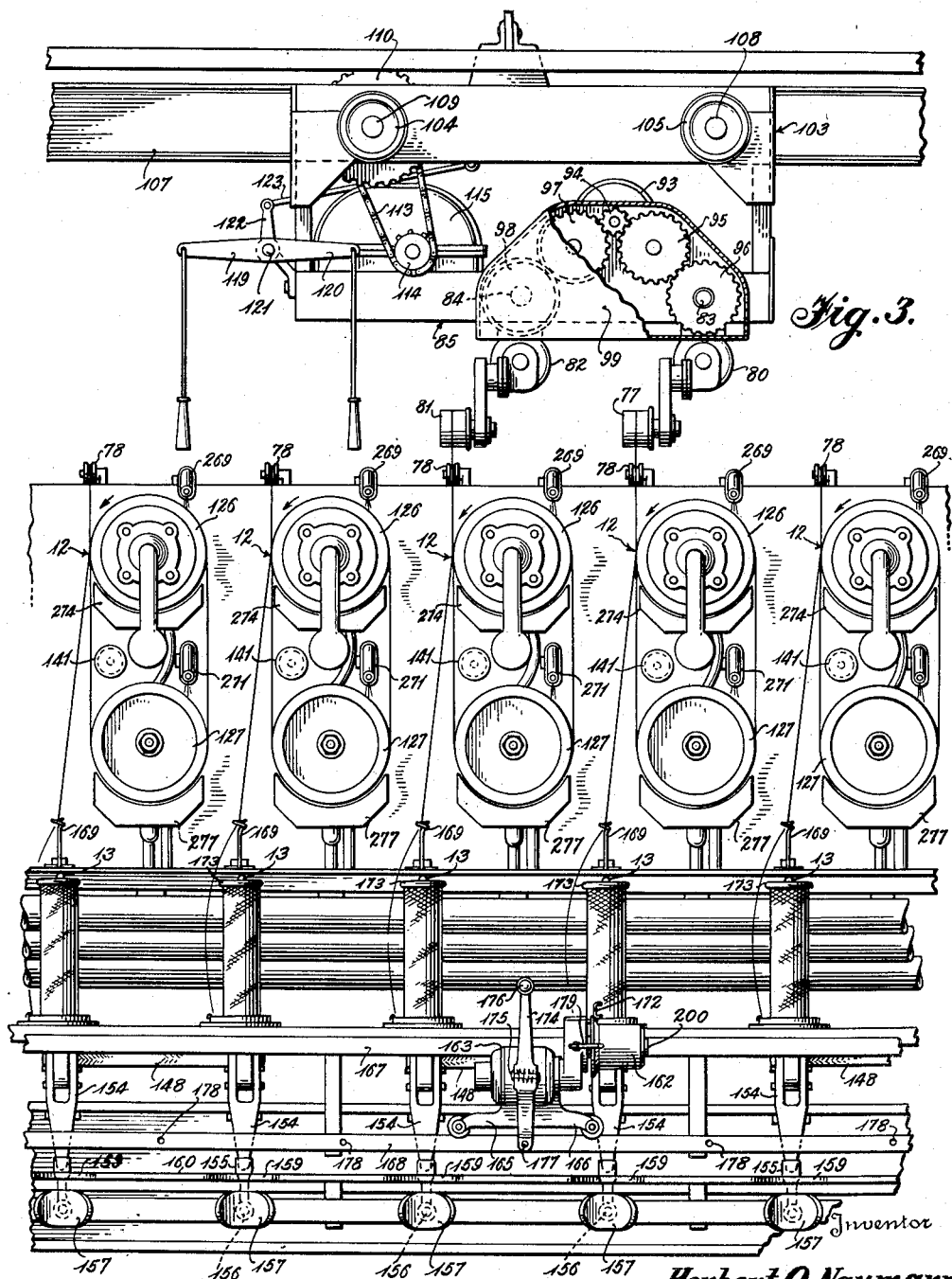
Figure 3 is a view in side elevation illustrating a portion of the left or finishing side of the machine of Figure 1.

Upon reference now to Figures 2 and 3, the manner of threading up a machine by the use of collecting devices 77 and 81 may be ascertained. In Figure 2, temporary collecting device 77 is disposed above a thread-storage, thread-advancing unit 11 designated by the reference letter A. At the same time, temporary collecting device 81 is over a thread-storage, thread-advancing device 12 in aligned position behind the unit 11 marked B on Figure 2. When unit A has been threaded up, the operator leads the free end of thread around temporary collecting device 77, which is driven by motor 80 continuously throughout the threading up period. Thereafter, motor 80 is bodily moved to the opposite side of the machine, carrying with it the thread issuing from unit A which is being concurrently wound on device 77. At the same time, temporary collecting device 81 is moved toward the operator on the spin bath side of the machine to a position over unit B similar to the position previously occupied by temporary collecting device 77 over unit A. Thus, one operator on the spin bath side of the machine may be threading up a unit B while another operator on the finishing side may be threading a unit 12 in alignment with the unit 11 marked A. In this way, both of the operators are continuously occupied. It will, of course, be understood that when the temporary collecting device completes its bodily movement across the machine, it will have wound thereon a very small amount of thread. This is treated as waste and the thread is broken by the operator directly adjacent the collecting device and led around the thread-storage, thread-advancing unit in question in a manner previously described. After the unit B of Figure 2 has been threaded, the position of temporary collecting devices 77 and 81 is again reversed. The operator then breaks the thread adjacent temporary collecting device 81 and begins threading the unit 12 which is in alignment with unit B of Figure 2. Thread-storage, thread-advancing unit 77, in its return movement from the finishing side to the spinning side of the machine, carries no thread over to a point above unit A since this unit has already been threaded. Accordingly, immediately after breakage of the thread adjacent temporary collecting device 81, as the operator starts to thread the unit 12 behind B of Figure 2, the entire assembly supporting temporary collecting devices 77 and 81 is moved to the right of Figure 2 a distance equal to twice the distance between the centers of adjacent units. This brings collecting device 77 over unit 11 marked C and device 81 over a unit 12 behind and in alignment with unit D. When this stage has been reached, the previously described operation is repeated and so on until the entire machine is threaded up.

It has been stated that motors 80 and 82 and the temporary collecting devices supported and driven thereby are bodily moved across the width of the machine. This movement is effected by the concurrent rotation of oppositely threaded screws 83 and 84 supported in rectangular frame 85 and in respective driving engagement with interiorly threaded members 86 and 87 which surround the threaded shafts 83 and 84 and have depending shanks 88 and 89 which serve to support motors 80 and 82 respectively. To prevent pivotal movement of motors 80 and 82 and the assemblies carried thereby about threaded shafts 83 and 84 as axes, brought about by the rotation of those shafts, members 86 and 87 are provided with arms 90 and 91 extending in mutually convergent relation at right angles to respective shanks 88 and 89. The free ends of arms 90 and 91 are slotted and receive therein a guide rail 92 which extends for the full width of the machine and is suitably supported in frame 85.

Since shafts 83 and 84 are oppositely threaded, it will be apparent that, if both are driven, members 86 and 87 will move across frame 85 in opposite directions carrying with them the respective motors 80 and 82 and temporary collecting devices 77 and 81.

The intermittent rotation of shafts 83 and 84 is effected through a reversible motor 93, the rotor shaft of which is provided with a pinion 94 (Fig. 2). Pinion 94 is operatively connected to threaded shaft 83 through an idler gear 95 which meshes with a gear 96 keyed to threaded shaft 83. A similar gearing arrangement including an idler 97 and a gear 98 keyed to shaft 84 serves to establish a driving connection between the latter and pinion 94. Conveniently, the gearing connecting the rotor of motor 93 and shafts 83 and 84 is enclosed in a dust-proof housing 99. It can now be seen that for any given direction of rotation of motor 93, members 86 and 87 will be driven in opposite directions. It is necessary, however, that the direction of bodily movement of collecting devices 77 and 81 be reversed each succeeding operation thereof. It is for this reason that motor 93 is of a reversible type. The exact construction of motor 93 forms no part of this invention, it being contemplated that any conventional reversible electric motor of suitable characteristics may be used. The motor is controlled through a circuit, not shown, from a pair of push buttons 100 and 101, each of which serves to drive the motor in one direction only. The stoppage of motor 93 is effected automatically by a pair of limit switches of any conventional construction disposed on opposite sides of bar 92 adjacent one of its ends, one switch being in the path of each of arms 90 and 91. Thus, for example, the rotation of motor 58 in one direction may be stopped when arm 90 reaches a predetermined position and the rotation in the other direction may be stopped when arm 91 reaches a similar predetermined position at the same end of frame 85. Since motor 93 will necessarily develop a certain amount of inertia in operation, it is highly desirable that the stoppage thereof be effected instantaneously to prevent possible damage of the equipment caused by either of members 86 or 87 exceeding the full amplitude of movement on screws 83 and 84. This is conveniently done by providing a magnetic brake 102, the control circuit for which is in circuit with the limit switches.

The bodily movement of temporary collecting devices 77 and 81 across the machine has now been described. It has been previously stated, however, that frame 85 is subject to bodily movement lengthwise of the machine. To this end frame 85 is supported from a car 103 having two pairs of flanged wheels 104 and 105 which ride in rails 106 and 107 supported above the machine in any convenient manner, see Figure 1. Wheels 105 may turn freely on axle 108 or many be attached thereto, the only requisite being that the wheel and axle assembly is freely rotatable. Wheels 104, however, are attached for free rotation at the ends of axle 109 and this axle, midway of its length, carries a keyed pinion 110 which is adapted to mesh with a rack 111 which extends for the full length of the machine at a position midway between rails 106 and 107. The manner of driving car 103 through rack and pinion 110—111 can now be described. To this end, axle 109 is provided with a keyed sprocket 112 connected by a chain 113 with a sprocket 114 on the rotor shaft of a motor 115. Thus, upon rotation of motor 115, sprocket 112 keyed to axle 109 will cause rotation of pinion 110, which, meshing with rack 111, will pull the car 103 in a direction opposite to the direction of rotation of pinion 110. By simply energizing motor 115, therefore, it can be seen that car 103 may be moved along lengthwise of the spinning machine. It is desirable, however, that the lengthwise movement be controlled so that temporary collecting devices 77 and 81 will be moved a distance exactly equal to twice the distance between the centers of adjacent units without the necessity for spotting the car. This controlled movement is effected by so arranging the diameter of pinion 110 that 360° of movement thereof will move the car exactly the desired distance. After completion of this movement, motor 115 is automatically de-energized and the inertia thereof automatically overcome. This is effected through a timing disc 116 keyed to axle 109 adjacent pinion 110. This disc, as may be seen in Figure 2, is provided with a notch and serves to position a switch arm 117. Disc 116 is so disposed on axle 109 that the notch therein will be in registry with switch arm 117 upon completion of the desired movement lengthwise of the machine. Thus, arm 117 is normally held in a position to maintain the circuit to motor 115 closed. It serves to open the circuit to motor 115, however, when in registry with the notch of disc 116, and, at the same time, through relays to operate a magnetic brake 118 of a type similar to magnetic brake 102 previously described. Thus, motor 115 is automatically stopped. Initiation of rotation thereof is effected through switch arms 119 and 120 connected at the ends of a long shaft 121 which extends for the full width of the machine. Switch arms 119 and 120 are disposed in a position to be conveniently operated from either side of the machine by pull cords. A linkage 122, 123, 124 connects shaft 121 with switch box 125 in which the various controls for both motors 115 and 93 are located, as well as the relays for the operation of the magnetic brakes. It can be seen that if the operator pulls switch arm 119 and then immediately releases it, motor 115 will operate until the notch in disc 116 permits switch arm 117 to open the circuit. At this point it will automatically stop. On the other hand, if the operator should hold switch arm 119 during the time that the notch in disc 116 and switch arm 117 are in registry, motor 115 would continue to run. Thus, while the lengthwise movement of car 103 will normally occur stepwise, it can be controlled to any extent by the operator. Switch arm 120 is used to drive motor 115 in the other direction and is normally employed for returning the entire threading up assembly to one end of the machine after threading up has been effected.

Having now described the manner in which the machine is threaded up including the apparatus for transferring the free ends from the units 11 to their respective units 12, the details of the latter units will be discussed.

Each unit 12 consists of two rollers 126 and 127, supported at one end only, and having their free ends extending generally horizontally. As in the case with lower roller 46 of unit 11, lower roller 127 is mounted on a shaft which extends axially of the roller and is in a truly horizontal position. This shaft, designated by numeral 128, is provided with a driving gear 129 keyed thereto which meshes with a gear 130 keyed to a main drive shaft 131. Drive shaft 131 is similar to drive shaft 50 and is provided with a plurality of gears 130, one for coaction with each gear 129 for each of lower rollers 127. Each meshing pair of gears 129, 130 is disposed in a housing 132 fixedly mounted on a portion of the main frame of the machine. Housing 132 is provided with a bearing 133 for supporting shaft 128.

Upper roller 126 of the thread-storage, thread-advancing unit 12 is likewise provided with an axially extending drive shaft, said shaft bearing the designation 134. Shaft 134 is provided with a gear 135 which meshes with a gear 136 mounted on main drive shaft 137. Shaft 137 is similar in structure and function to shaft 59 and it is provided along its length with a number of gears 136 corresponding to the number of rollers 126. The pairs of gears 135 and 136 are mounted in housing 138, each of which extends for a considerable distance into the interior of a roller 126. Housings 138 are elongated in this manner so that the bearings for shaft 134 are spaced apart a sufficient distance to insure rigidity of that shaft and to prevent wobbling movement of roller 126 in response to radial thrust. Only one bearing for shaft 134 can be seen in Figure 1, this being designated by the numeral 139. Note that the elongated housing structure is likewise carried out in lower roller 126. The remaining portions of housings 132 and 138 will be hereinafter more fully described in conjunction with the detailed construction of rollers 126 and 127.

It is contemplated that housing 138 be mounted for pivotal movement on tubular support 139, the construction of which is conveniently identical to the construction of tubular support 63 associated with housings 58. It is understood that the angular disposition of shaft 134 may be varied by the employment of a construction such as that used in changing the angular position of shaft 55. Since the apparatus employed is identical to that used in conjunction with roller 45, further description thereof is deemed unnecessary. Note threaded shaft 140 which corresponds to similar shaft 64 and dust cap 141 through removal of which access to shaft 140 may be gained in order to adjust the angular disposition of roller 126. Housing 132, which corresponds to housing 51 on the other side of the machine, is mounted on a portion of the main frame in such a way that shaft 128 extends in a truly horizontal position. It will be recalled that the angular position of shaft 47 is not adjustable. This is also true of shaft 128.

It is, of course, necessary that each upper roller 126 and its corresponding lower roller 127 be driven at the same peripheral speed. It is likewise desirable that the takeup speed of unit 12 be approximately the same as the delivery speed of unit 11. Upon reference to Figure 4, the manner of accomplishing this may be ascertained. In that figure, it can be noted that main drive shafts 130 and 137 are provided with gears 142 and 143, respectively. These gears are driven by gear 144 on a shaft 145, the opposite end of which carries a gear 146 in mesh with a gear 147 which rests against and meshes with driving gear 75. The latter, it will be recalled, serves also to actuate shafts 50 and 59 to drive the component rollers of unit 11. By substitution of gears of various diameters in the gear train 144, 146, 147, it is possible to bring about any desired speed on the part of rollers 126 and 127 with respect to rollers 45 and 46. Since, however, all rollers 126 and 127 are driven from the same gear, 144, it is apparent that they will have identical peripheral speeds.

As has been previously stated, thread-storage, thread-advancing unit 12 is threaded up in the same manner as the respective unit 11. On thread-storage, thread-advancing unit 12, the thread is subjected to further after treatments, and, when it leaves that unit, is in finished form. It is then led directly to a ring twister mechanism, best shown in Figures 1 and 3, inclusive. The twister mechanism shown is largely conventional, being somewhat modified, however to fit under unit 12 in the interest of space conservation. Twister spindles 13 are driven in pairs from belts 148 which pass over and are propelled by a cylindrical pulley 149 keyed to a power shaft 150 driven in any convenient manner, now shown. The usual idler pulleys 151 are associated with belt 148 and a counterweighted belt tightener pulley 152 is employed. Each twister spindle 13 is provided with the usual brake 153 for localized stoppage of the spindle for the exchange of spools. The brake, itself, is conventional in form but is provided with novel engaging means consisting of a depending arm 154 cooperating with an upwardly extending arm 155 provided with a bifurcated end. Arm 155 is driven through a rod 156 provided with a curved operating surface 157 adapted to be engaged by the leg of the operator as he stands beside the machine. A spring 158 normally biases rod 156 and hence arm 155 to release position. Thus, depending arm 154 is normally biased in a clockwise direction as viewed in Figure 1 thereby urging brake 153 away from the bottom of the spindle, arms 154 and brake arm 153 functioning mechanically as a bell crank. The operating surface 157 is disposed in registry with notched-out portions (not shown) of a grill work 160 serving as a platform on which the operator may stand while threading unit 12. Grill work 160 is supported by braces 161 extending from the main frame of the machine. As can be seen in Figure 1, braces 161 constitute guide bearings for rod 156. The operator, on the other hand, stands on the ground floor of the operating room when twister spindle 13 is threaded up, and, as a consequence, the twister brake operating surface is located for manipulation from that level.

It is contemplated that the thread issuing from unit 12 will be delivered at a rate approximating 60 to 100 meters a minute. Ring twisters, on the other hand, are normally used with thread being pulled for a stationary package. As a consequence, it is impossible for an operator to thread up the traveler of a ring twister with a thread moving at a speed such as is here contemplated, the slack produced being so great as to cause substantial difficulty. For this reason, a novel device and method for threading up the ring twister has been provided. This device consists of a temporary collecting drum 162, driven through a very sensitive clutch, hereinafter more fully described, by an electric motor 163. The housings of electric motor 163 and drum 162 are fastened together to form a unitary structure and that structure is provided with arms 164, 165 and 166 (Figs. 1 and 3) on the respective ends of which wheels are provided. These wheels are arranged to ride in tracks 167 and 168 affixed to the moving traverse ring board, which, during twisting, is reciprocated in a vertical direction in a conventional manner. Tracks 167 and 168, in addition to supporting motor-drum assembly 162—163 for movement therealong, act as conductors for the supply of electric current to motor 163. A thread guide 169 supported by a rod 170 is located vertically above and in alignment with twister spindle 13. When the twister traveler 171 is to be threaded, the operator leads the free end of thread issuing from roller 126 of thread-storage, thread-advancing unit 12 and wraps it around a cylindrical spool fitted over drum 162 which has been caused to rotate by energizing motor 163. The driving arrangement between motor 163 and drum 162 is such that the takeup speed of drum 162 will be in excess of the delivery speed from thread-storage, thread-advancing unit 12, a drum takeup speed of approximately five meters a minute in excess of the delivery speed from unit 12 being contemplated. Thus, the thread will be under very slight tension at this stage. The operator then pulls the thread A to the left, and threads it through a guide 172 mounted on the motor-drum assembly and through guide 169 above the twister spindle. The thread is then passed under traveler 171. Once this is done, the thread is broken between twister traveler 171 and the drum, the free end being thrown into the rapidly rotating twister bobbin 173 mounted on spindle 13. The relatively small amount of thread collected on the bobbin of drum 116 may be removed therefrom and discarded as waste. In order that the motor-drum unit 162—163 can be moved from spindle to spindle as the respective twisters associated with each unit 12 are threaded up, the wheel-rail assembly is provided. As a consequence, when one twister spindle has been served, the motor car is moved to the next adjacent one. At each unit, however, the motor is locked in operative position. This is done by means of a lever 174 pivoted at 175 to the motor housing. Lever 174 is provided with an operating handle 176 and a pin 177, adapted for cooperation with holes 178 (Fig. 3) provided at spaced points along lower track 168. When pin 177 is received in a hole 178, the motor and drum unit is restrained against movement along the tracks. When it is to be moved, however, the handle 176 is pushed in toward the twister spindle thereby extracting pin 177 from hold 178 and allowing the device to be manually moved along the track to the next stage.

In Figure 3, a wire guide 179 can be seen extending from a portion of the motor housing. This guide is to insure that the thread is wound on drum 162 and cannot be accidentally wedged in between the drum and the motor assembly to be engaged by moving parts.

The description of the machine has thus far been concerned entirely with the mechanical manipulation of the thread in its movement between the spinneret and the twister, the rollers 45, 46 and 126, 127 having been described only with respect to their thread-supporting and propelling functions. However, the rollers of thread-storage, thread-advancing units 11 and 12 also have extremely important functions with regard to the manner and duration of the aftertreatments to which thread is subjected during passage thereover. As a prerequisite to the understanding of these functions, the detailed structure of the units per se as well as the means for supplying liquids thereto must be considered.

Figure 5:
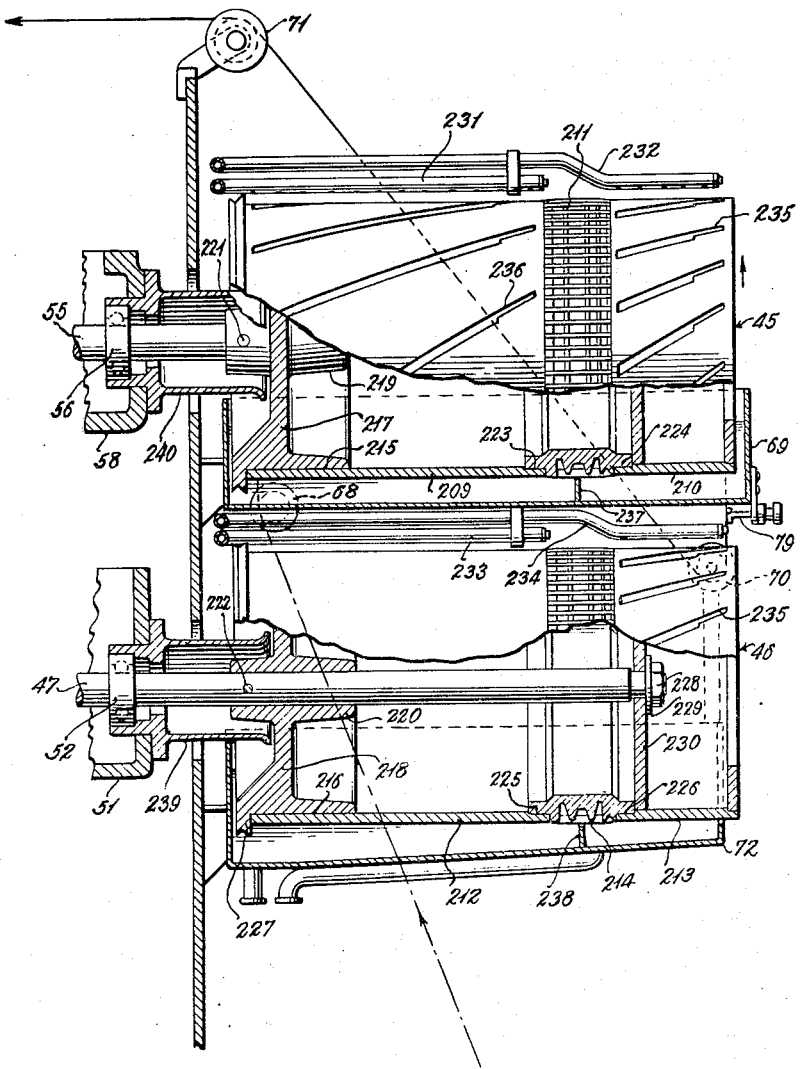
Figure 5 is a view partially in section and partially in side elevation of a thread-storage, thread-advancing unit typical of those employed on the spinning side of the machine of Figure 1.

The structural details of thread-storage, thread-advancing device 11 are illustrated in Figure 5. It can be seen that rollers 45 and 46 are composite in nature, each consisting of two hollow cylinders spaced apart by annular members. Roller 45 is made up fo hollow cylinders 209 and 210 between which a shouldered annular member 211 is interposed. Roller 46 is similarly constructed, consisting of hollow cylinders 212 and 213 separated by a shouldered annular member 214. Cylindrical portions 209 and 212 are sweated or pressed over cylindrical supporting surfaces 215 and 216, respectively, said supporting surfaces being integral with spiders 217 and 218, respectively, having hubs 219 and 220 keyed at 221 and 222 to shafts 55 and 47. The unsupported end of cylinder 209 is fitted over shoulder 223 of annular member 211 and an end of cylinder 210 is similarly arranged with respect to the shoulder 224 thereof. A like construction obtains in roller 46 where the free end of cylinder 212 fits over shoulder 225 of annular member 214 while an end of cylinder 213 fits over its shoulder 226. So that cylinders 212 and 213, with their interposed annular member 214 may be held as a unit to form roller 46, they are compressed between an annular flange 227 extending outwardly from spider 218 and a nut 228 threaded onto an end portion of shaft 47 and bearing through a washer 229 against a disc 230 fixed to cylinder 213. The construction shown and described in detail in connection with roller 46 likewise obtains with respect to roller 45.

While the two cylinders and the associated annular member making up each of rollers 45 and 46 function as a unit so far as thread-storage, and thread-advancing are concerned, the cylinders and interposed annular members have different functions with regard to the application of treating liquids to the thread. Thus, liquids are sprayed individually on the surfaces of cylinders 209, 210, 212 and 213. This is effected by disposing discharge pipes above the various cylinders, see Figures 2 and 5. Pipe 231 is above cylinder 209, pipe 232 is above cylinder 210, pipe 233 is above cylinder 212 and pipe 234 is above cylinder 213. These pipes are perforated on the underside so that liquids passing therethrough will be discharged in the form of a spray onto the surface of the underlying cylinder. As has been previously indicated, the cylinders illustrated in Figure 5 are intended for rotation in a clockwise direction as viewed in Figure 2. For this reason, the spray pipes are disposed on the left hand side of the rollers 45 and 46 as viewed in that figure to aid in the distribution of liquid over the respective cylindrical surfaces. Since thread moving on thread-storage, thread-advancing device 11 will pass around both rollers in the form of a coil, it is evident that the same treating liquid will be supplied by pipes 231 and 233 to cylinders 209 and 212 while a different liquid may be supplied from pipes 232 and 234 to cylinders 210 and 213. Because of the fact that the apertures in the various pipes are more or less evenly distributed over the axial length of the respective cylinders, the liquid distribution over the surface of the cylinders would be apparently quite even. It has been found, however, that only liquids of low surface tension having good wetting out properties will form a cylindrical film of substantially constant thickness over the full axial length of a smooth cylindrical surface. Other liquids with low wetting out characteristics tend to form relatively thick annular bands directly under each pipe outlet, the intervening spaces being inadequately covered. Since controlled duration of liquid treatment goes to the very essence of aftertreatment of wet spun threads of synthetic origin, smooth cylindrical treating surfaces are wholly unsuitable for some of the aftertreatments requisite to the production of high quality thread. The surfaces of the component cylinders of rollers 45 and 46, however, are arranged in a manner to overcome the difficulty heretofore encountered and to distribute any treating liquid over a cylindrical zone of predetermined axial length in the form of a film of uniform thickness throughout its length. Thus, by knowing the linear speed of thread travel over a cylindrical treating surface, the axial length of that surface, the diameters of the two cylinders constituting a treating zone, and the coil spacing in that zone, it is possible to accurately predetermine the time period that any given point on a thread will be subjected to a given chemical treatment. Since the angle of convergence of the rollers is a function of coil spacing and since that angle is an adjustable one while the component cylindrical sections of each roller are removable, see nut 228 in Figure 5, it is evident that both coil spacing in a zone and the axial length thereof may be altered to meet differing treatment requirements.

The uniform distribution of liquids over the surfaces of cylinders 209, 210, and 213, as well as the rate of axial movement of such liquids, is controlled by grooves 235 and 236 cut in the cylindrical surfaces. The structural details and function of grooves 235 and 236, as well as their theory of operation, will be hereinafter explained in greater detail. For the present it will suffice to say that the grooves shown in Figure 5 move liquids sprayed on the cylinders from right to left as viewed in that figure. To prevent intermixture of liquids on cylinder 210 with those on cylinder 209 and similarly to prevent intermixture of liquids on cylinder 213 with those on cylinder 212, the respective annular member 211 and 214 are exteriorly grooved. The detailed structure and function of these grooves will be hereinafter more fully set forth. However, since these grooves prevent intermixture of the liquids on adjacent cylinders, partitions 237 and 238 in troughs 69 and 72 extend under the respective central grooves of annular members 211 and 214 so that the liquids discharged from adjacent cylinders may be separately recovered.

Flange 227 on spider 218 serves to prevent any treating liquid, which may be corrosive in nature, from reaching bearing 52. As a further protective step in this connection, a housing 239 extends over hub 220 of spider 218, said housing being attached to main housing 51. A similar arrangement involving a housing 240 obtains in connection with the assembly of upper roller 45.

Figure 6:
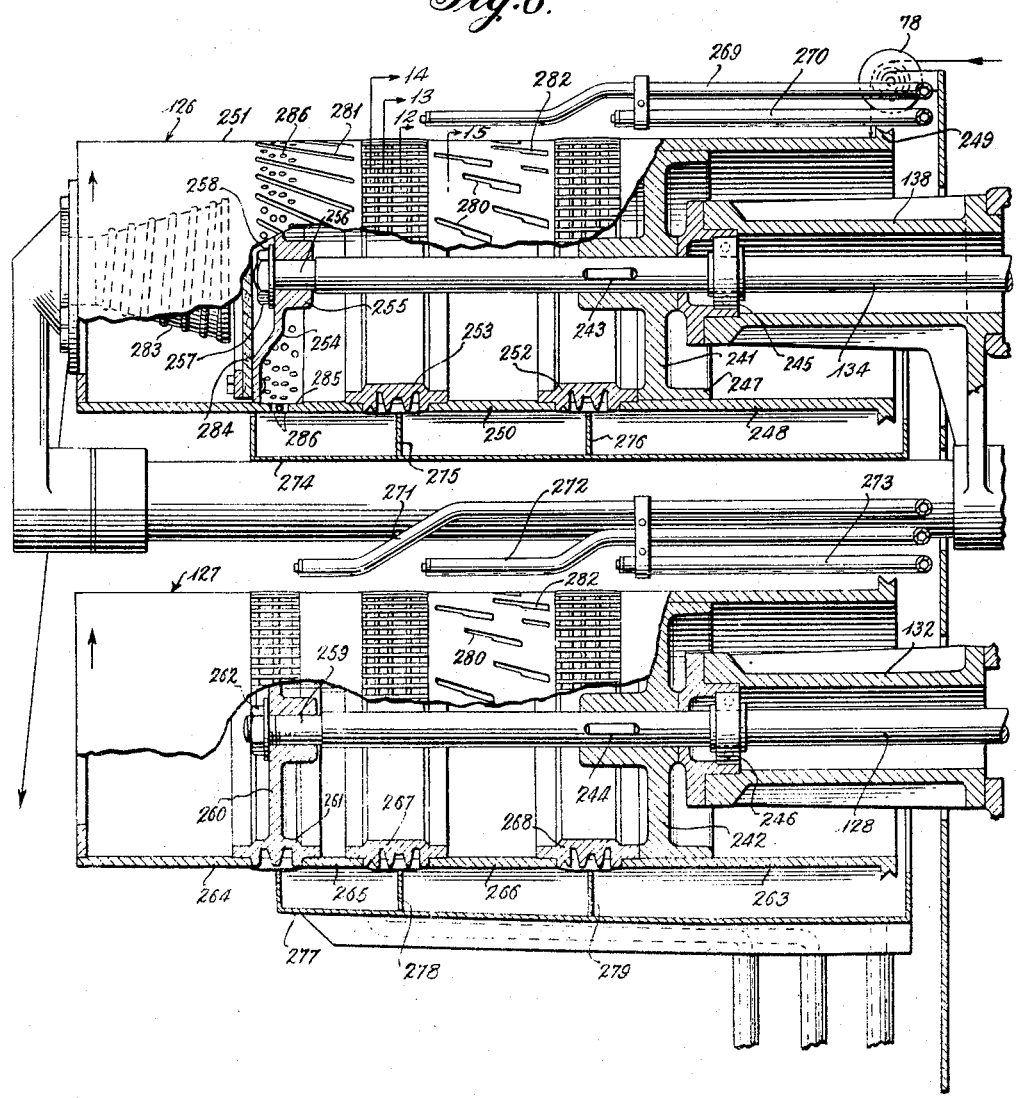
Figure 6 is a view partially in section and partially in side elevation of a thread-storage, thread-advancing unit typical of those employed on the finishing side of the machine of Figure 1.

Thread-storage, thread-advancing unit 12 is composed of two rollers 126 and 127 which have been in part described. These rollers are driven from shafts 134 and 129, respectively, through spiders 241 and 242, keyed respectively at 243 and 244, as can be seen in Figure 6. Note also that housings 138 and 132 extend well into rollers 126 and 127 so that bearings 245 and 246 may be spaced on shafts 134 and 128 a substantial distance from respective bearings 139 and 133, see Figure 1.

Spider 241 is provided with a cylindrical portion 247 over which a cylinder 248 is pressed. This cylinder is provided with an annular flange 249, similar in function to flange 227. Roller 126 is made up in much the same manner as rollers 45 and 46 and includes, in addition to cylinder 248, cylinders 250 and 251, and shouldered annular members 252 and 253 similar to members 211 and 214 shown in Figure 5. The cylinders are fitted over the shouldered portions of annular members 252 and 253 in the same manner as cylinders 209 and 210 are fitted over the shoulders 223 and 224 of annular member 211. Integral with or attached to cylinder 251 is a spider 254 provided with a central hub 255 through which the threaded free end 256 of a shaft 134 is passed. A nut 257 may be drawn against a washer 258 to pull cylinder 251 toward cylinder 248, thereby holding the intermediate annular members and cylinder 250 so that the entire assembly may function as a unit.

Practically an identical arrangement is used in drawing together the component parts of roller 127. In the latter case, shaft 128 is provided with a threaded end 259 passing through a central aperture in a spider 260 integral with an annular member 261, and a nut 262 engaging shaft end 259 serves to draw together all of the components of roller 127 between annular member 261 and a cylinder 263, similar to cylinder 248 of roller 126. Cylinder 264 is pressed over a shoulder of annular member 261 so that it need not be subjected to the compressive force exerted by nut 262. Between annular member 261 and cylinder 263, two cylinders 265 and 266 and two shouldered annular members 367 and 368 are interposed, the arrangement being as previously described in conjunction with rollers 45, 46 and 126.

As is the case with unit 11, the various cylinders making up unit 12 are provided with liquid supply pipes as may be seen in Figures 3 and 6. Thus, a pipe 269 supplies liquid above cylinder 250 and similar pipes 270, 271, 272 and 273 perform a corresponding function in connection with cylinders 248, 265, 266 and 263, respectively. Underlying cylinder 126 is a collection trough 274 having partitions 275 and 276 underlying respectively annular members 253 and 252. In this way, liquid supplied to the various component cylinders of roller 216 may be separately recovered. A trough 277 underlies roller 127 and this trough is partitioned at 278 and 279, the partitions underlying respectively annular members 267 and 268.

Upon reference to Figure 6 it will be noted that cylinders 250 and 266 are provided with grooves 280 and that there are some grooves 281 at the right hand side of cylinder 251. It has been previously stated that these grooves and grooves 235 and 236 of Figure 5 function to distribute liquids over the surface of the cylinders in which they are located, the liquids being supplied from the pipes disposed above the particular cylinder. The explanation of the structure and function of these grooves will be undertaken in connection with grooves 280 disposed on cylinder 250 of roller 126. Thereafter, the structure and function of the various types of grooves can be explained in the light of the basic theory of operation. In Figure 15, which is a sectional view, some conception of the depths of grooves 280 is ascertainable. They are disposed helically about the surface of cylinder 250, although on that cylinder no single groove extends for the full axial length of the cylinder. For convenience in explaining the theory of operation of grooves 280, a portion of the surface of cylinder 250 is developed in Figure 7. It can be seen that grooves 280 extend at an angle $\theta$ to a plane at right angles to the axis of the cylinder, which, of course, is also the axis of the helix. It will be recalled that the direction of rotation of the rollers shown in Figure 3 is counterclockwise. Thus, a drop of liquid lodged in a groove 280 after having been sprayed through apertures in pipe 269 will have a tendency due to inertia, to remain stationary. The cylinder, however, rotates in a counterclockwise direction so that as a result of the inertia of the liquid it is caused to progress in an axial direction toward the supported end of the rollers 126 along the groove. By study of the grooves in the developed surface of cylinder 250, as viewed in Figure 14, it can be seen that, if the cylinder is rotating in the direction indicated by the marginal arrow in that figure, liquid flow will be in the direction of the flow arrows. It is also evident that the rate of liquid flow in an axial sense will be dependent upon the magnitude of angle $\theta$.

The control of the rate of liquid flow in relation to the helix angle of the grooves can best be expressed mathematically, reference being made to the calculations in Figure 11. Let it be assumed that $\theta$ equals the helix angle, $c$ equals the force acting on the liquid, i. e., the force derived from rotation of the cylinder, F the force acting in an axial direction, and $b$ the component of force along the groove. Since the angular displacement of the cylinder is constant, it is evident that $c$ will have a constant value and that the angle defined between the line $c$ and the groove line $b$ is equal to the helix angle $\theta$. Thus, the rate of acceleration of liquid in an axial sense may be derived as follows:

$$\cos \theta = \frac{b}{c}$$

therefore:

$$b = c \cos \theta$$

likewise it is evident that the angle between line F and line $b$ is equal to 90° minus $\theta$. This angle is designated as $\phi$. Thus:

$$\cos \phi = \frac{F}{b}$$

so that $$F = b \cos \phi$$

or, since $b$ is equal to $c \cos \theta$:

$$F = c \cos \theta \cos \phi$$

Since $\phi$ decreases as $\theta$ increases, it is evident that when the groove extends parallel the axis of the cylinder, $\phi$ is equal to zero. When this is the case, F is also equal to zero. Conversely, if the groove is at a 90° angle to the axis of the cylinder $\theta$ is equal to zero so that again F is equal to zero. Thus, the axial acceleration of liquids moving along the cylinder may be expressed, by the following formula:

$$a = \frac{F \times M}{k}$$

Where K is a constant and M represents the mass which may be assumed constant for any given angular disposition of the grooves, $a$ will vary directly dependent upon the value of F and angle $\theta$ is a function of the value of F as follows:

$$F = c \cos \theta \cos \phi$$

or $$F = c \cos \theta \sin \theta$$

the latter being evident since $\phi = 90 - \theta$. Thus, since $\theta$ is equal to the helix angle of the grooves, it is evident that the rate of axial movement of the liquid displaced by helical grooves on any one of the cylinders will be related to the helix angle as a dependent variable. This relation is a function of the cosine times the sine of the helix angle.

From the foregoing, it is apparent that when the helix angle is 45°, the accelerating force acting in an axial direction reaches its maximum. No axial movement occurs if the groove is parallel to the axis of the cylinder or if the groove is at right angles to that axis. It is further evident that if the angle $\theta$ of the illustration of Figure 7 is increased beyond 90°, the cycle repeats itself but the liquid is moved in the opposite direction assuming a constant direction of rotation of the cylinder. Thus, as viewed in Figure 7, the lqiuid moves from left to right. On the other hand, if the developed cylinder there shown were rotated in the opposite direction, the liquids would move from right to left.

While the provision of cylinders having helically disposed grooves in the surface thereof will cause movement of liquids axially therealong, in accordance with the foregoing theory, axial movement in itself is of little value in connection with the aftertreatment of synthetic threads, since the liquids tend to move in the grooves while the thread rests on the surface of the cylinder and tends to bridge across the grooves. From this it can be seen that insofar as thread treatment is concerned the desirable thing is to have movement of the liquid and distribution thereof in the form of a continuous film over the surface of the cylinder in position to contact the coils of thread. It is in this latter connection that grooves 280 are provided with flared portions 282. The flared portions 282 are of greater width but, on one side, of lesser depth than the respective grooves and serve to cause the liquid to spread out and move circumferentially as a film until it is picked up by the next groove which recommences axial movement, see the flow arrows in Figure 7. Because of the grooves 280 and the flared portions 282 thereof, liquids sprayed on cylinder 250 from pipe 269 will be well distributed over the cylinder and will move axially as a film toward the supported end of roller 126. This movement is quite distinct from any movement brought about by reliance on gravitational force since it will be recalled that shaft 134 of roller 126 slopes downwardly in the direction of the unsupported end of the unit. Thus, liquids moved in the direction of the supported end of the unit, are, on the surface of cylinder 250, moved upwardly. Since shaft 134 slopes downwardly, while shaft 129 is in a truly horizontal position, it is evident that if the same helix angle for grooves 280 were to be used on cylinders 250 and 266, the rate of liquid movement on cylinder 266 would be greater than the rate of liquid movement on cylinder 250. To compensate for this, the angle θ, see again Figure 7, is of greater magnitude for the grooves 280 on cylinder 250 than for the grooves 280 on cylinder 266, i. e., for cylinder 250 θ more nearly approaches 45°. By compensation, it is therefore possible and intended that the liquids shall move at the same rate on the surface of cylinders 250 and 266, in the former case against the force of gravity.

It will be noted that while grooves 235, 236, 280 and 281 are all helically disposed, the configuration of each is somewhat distinct. This is to adapt the grooves to the particular treatment contemplated on the cylinder on the surface of which they are cut. Where the liquid treatment is a mechanical one, such as washing, rapid counterflow of liquid is desirable. Thus, grooves 235 in cylinders 210 and 213 are disposed in such a manner as to insure both rapid flow and rapid distribution. Note the rather substantial length of the flared portion of each groove. The washing water supplied through pipes 232 and 234 is moved in considerable volume and fairly rapidly from right to left, as viewed in Figure 5. Thus, the thread leaving unit 11 is in contact with fresh water while the thread entering cylinders 210 and 213 is contacted first with water which has therein certain impurities removed from the thread. It is contemplated that in the treatment of freshly spun viscose yarn, the liquid applied to cylinders 209 and 212 be an acid. This acid is subsequently removed by washing on cylinders 210 and 213. Since the acid treatment effected on cylinders 209 and 212 is chemical in nature rather than mechanical, liquid movement on roller 212 is not necessary. The acid has good wetting out properties and spreads fairly evenly over cylinder 212 in the form of a film through which the thread is passed. Of course, cylinder 209 is used in the same treatment. This cylinder, however, is not disposed truly horizontally but slopes in the direction of the unsupported end of the unit. Thus, grooves 236 are provided for the purpose of counteracting the effect of gravity.

In the aftertreatment of freshly spun viscose yarn, cylinders 248 and 263 of unit 12 can be conveniently employed as a desulphurizing zone. The desulphurizing liquid has been found to be self-distributing, the treatment is a chemical one, and, for that reason, the surfaces of cylinders 248 and 263 need not be grooved. Cylinders 250 and 266 constitute another washing zone. Here substantial quantities of water are supplied to the cylinders and are moved from left to right as viewed in Figure 6 in a manner hereinbefore explained in connection with Figure 7. Cylinder 265 is used for the application of a finishing solution to the thread. This solution need not be supplied in large amounts and having a low surface tension, is more or less self-distributing. Consequently, cylinder 265 is not provided with grooves to cause axial movement of the liquid supplied from pipe 271. Since only a small amount of the finishing solution is applied to the thread, no similar zone on roller 126 is required. However, a portion of cylinder 251 extends over cylinder 265 and the former, near its unsupported end, is provided with a heating unit 283 which is in registry with cylinder 264 of roller 127. This is a radiant heat unit, fully described in Patent No. 2,244,745. As a result of its use, the surface of cylinder 251 adjacent the unsupported end thereof is subjected to considerable heat. It is undesirable, however, that the finishing solution be dried before it is applied in an adequate amount. Consequently, a heat insulated disc 284 serves to divide the interior of cylinder 251 into two portions. Disc 284 is conveniently held in position by bolting to spider 254. Disc 284 prevents the radiation of heat into the portion of cylinder 251 which is in vertical registry with cylinder 265. The surface of cylinder 251, however, is of a heat conductive material. Thus, to prevent the surface conduction of heat along cylinder 251 beyond disc 285, a cooling zone 285 is interposed. This cooling zone is best viewed in Figures 18 and 19. It can be seen that the thickness of cylinder 251 is reduced at annular zone 285 and that a number of perforations 286 are provided therein. These allow the atmospheric air in the spinning rooms to pass through a portion of the cylinder to cool the same. Grooves 281, on the surface of cylinder 251, tend to move any finishing solution carried by the thread from cylinder 265 to cylinder 251 to the right of the latter as it is viewed in Figure 6 so that it cannot get onto the heating zone.

The grooves in the surfaces of the various cylinders of thread-storage, thread-advancing devices 11 and 12 have now been described. These grooves are employed when viscose rayon is to be aftertreated as hereinbefore specified. It will be understood, however, that the grooves shown in Figures 12 and 13 do not constitute the only arrangements for the distribution and movement of liquids over treatment cylinders. In Figure 8, a developed cylinder 287 is shown having flared grooves 288 cut in the surface thereof. It will be seen that the various helical grooves are circumferentially spaced about the surface of the cylinder in such a way that the flare of one groove is partially in registry with the deep portion of the adjacent groove and partially in registry with the flared portion thereof. Under these conditions the flow will be as indicated by the arrows in Figure 15. As compared with the construction of Figure 7, it can be seen that the grooving arrangement of Figure 8 allows for slightly more circumferential movement of the liquid intermediate its propulsion in an axial sense. All through the specification it is stated that liquids are moved axially. It is understood, of course, that the liquids move along the grooves in a helical direction which will inherently involve axial advancement.

Figures 9 and 10 illustrate developed cylinders 289 and 290 having flared grooves 291 and 292 in the respective surfaces thereof. Cylinders 289 and 290 are of particular utility where the treatment zone in question is to be of short axial length. Since the supply pipe above the cylinder extends for the full axial length thereof, and, since liquids are sprayed from closely spaced points on the underside of each pipe, it is important that flared zones be located at the left as well as the right side of the cylinders 289 and 290 so that some of the liquid sprayed on the left side of said cylinders will be spread circumferentially prior to initiation of its axial movement. It will be noticed that grooves 291 and 292 are disposed at very nearly a 45° helix angle. As a consequence, liquid movement and replacement will be extremely rapid. The flow arrows in Figures 9 and 10 illustrate the liquid distribution.

In describing the grooves on the various cylinders constituting thread-storage, thread-advancing devices 11 and 12, it has been explained how the liquid is applied to each cylinder and how it is distributed thereover. A matter of equally great importance is the discharge of the used treating liquid from the various cylinders and the individual recovery of the treating liquids without contamination brought about by admixture of liquid supplied to adjacent cylinders. In this latter regard, particular attention is directed to Figures 16 and 17 in which the grooved outer surface of shouldered annular member 253 is illustrated. By comparison of exteriorly grooved annular members 252, 267, 268, 211 and 214, it may be seen that all of them are of similar configuration. Thus, the detailed description of annular member 253 and its theory of operation will serve as a basis for the understanding of the operation of all of the similar annular members.

In Figure 16 it can be seen that shouldered annular member 253 is disposed between cylinder 251 and 250. The exterior surface of annular member 253, which lies between the surfaces of cylinders 250 and 251, is provided with four annular grooves 293, 294, 295 and 296. These grooves are of varying depths, as may be seen in Figure 17. It is well known that centrifugal force is equal to mass times velocity squared over radius or $$F_c = \frac{M(V^2)}{r}$$

Thus, so long as liquids are to remain on the surface of cylinders 250 and 251, centrifugal force must not exceed the adhesion value of the liquid at any given point. The peripheral speed and the radius of all of the cylinders constituting units 11 and 12 are so correlated that liquids will not be thrown off those cylinders by centrifugal force. However, any liquid moved by grooves 281 from left to right on cylinder 251 will eventually come to groove 293 in annular member 253. When this groove is filled with liquid, the mass factor of the foregoing formula will be enormously increased by accumulation, while the velocity and radius factors will remain substantially constant. Thus, there will be a tendency for liquids lodged in groove 294 to be discharged in a plane normal to the axis of the cylinder and extending coincident with said groove. This tendency is not fully effective, however, for, if it were, the liquid discharged from groove 293 could not be effectively collected in that portion of trough 274 lying to the left of partition 275 as viewed in Figure 6. Thus, the peripheral speed of roller 126 is so correlated with its diameter that the tendency to discharge from groove 294 will be exactly balanced by gravity during the 180° of movement above a horizontal plane passing through the center of the roller. During this arc of movement, gravity acts counter to centrifugal force. However, during the 180° of movement below a horizontal plane passing through the center of the roller, gravity acts concurrently with centrifugal force and the cumulative effect causes liquid discharge from groove 293 into underlying through 274. While the amount of liquid entrained by the thread and delivered to the surface of cylinder 251 will probably be so slight that groove 293 can discharge the liquid as fast as it is delivered, this is not true of all of the zones, particularly in the case of annular members 252 and 258. It is for this reason that groove 294 is provided. The function of groove 294 is the same as the function of groove 293 and it acts cumulatively with the latter to discharge liquids when they are supplied to groove 293 faster than that groove can effect the discharge. Note that groove 294 is quite deep, see Figure 17. Next to groove 294 is a groove 295 which is the widest of the grooves in annular member 253. This groove is normally dry at all times except when, occasionally, a drop of liquid is carried through from the thread. This may be considered the separation groove. In other words, no liquids moving from cylinder 251 will be able to progress beyond groove 294 in an axial sense. It is for this reason that groove 295 is disposed in vertical registry with partition 275. The corresponding grooves of all of the annular members are disposed in like manner with respect to the associated partitions. Since liquids are moving on cylinder 250 from left to right, as viewed in Figure 16, there is no groove corresponding to groove 293 on the right side of groove 295, the reason being that groove 296 is sufficient to discharge any liquid which may creep from right to left on cylinder 250 before it is acted upon by a groove 270. In this connection, note that discharge pipe 269 extends to the left-hand extremity of cylinder 250. Of course, annular member 252 at the right-hand extremity of cylinder 250 is provided with two grooves corresponding in structure and function to grooves 293 and 294 since the major portion of liquid discharged from cylinder 250 will occur at those points. It is, of course, contemplated that if liquids on adjacent cylinders are moved toward one another that the intervening separation zone constituting an exteriorly grooved annular member will be provided with grooves corresponding to grooves 293 and 294 on either side of the middle groove corresponding to groove 295. Liquid creepage toward the supported ends of cylinders 248, 263, 209 and 212 is stopped by flanges such as 227 and 249. Adjacent these flanges discharge occurs if the mass is sufficiently augmented by accumulation, which, as a practical matter, seldom occurs.

While grooves 293, 294, 295 and 296 in annular member 253 and the corresponding grooves in the other annular member serves to positively separate liquids on adjacent cylinders against admixture and provide for separate recovery of each liquid so that it may be recirculated through a control station and used again, it is evident that the passage of thread along the cylinder in the form of a large number of spaced connected coils would be prevented by such grooves so that the practical value of the latter would be very slight indeed. However, another novel arrangement has been provided to permit use of discharge grooves and, at the same time, to allow for convenient threading up of the machine and use thereof. In Figures 16 and 17 it can be seen that a plurality of circumferentially spaced bridges 297, each extending axially of the roller, are disposed above annular member 253. To position these bridges, the ends of cylinders 250 and 251 are provided with a plurality of recesses 298 to accommodate opposite ends of each bridge 297. The bridges are further positioned by circumferentially spaced longitudinal grooves in annular member 253, said grooves extending for the full width of the annular member which lies between the surfaces of cylinders 250 and 251. The longitudinal grooves in annular member 253 allow bridges 297 to be partially countersunk as viewed in Figure 17. Thus, the thread is supported by bridges 297 as it passes above grooves 293, 294, 295 and 296. A single coil of thread in passing around any of the cylinders of units 11 and 12 defines an arc of substantially 180° in magnitude. Disposition of the thread on bridges 297, however, is not arcuate, but rather polygonal. If the surface of bridges 297 lay exactly flush with the surface of cylinders 250 and 251, the thread path over the bridges would be chordwise between them. Thus, a polygon of lesser periphery than the periphery of the adjacent cylinders would be defined. This would be evidenced on the machine by wobbling of the thread in the separation zones, a tendency which would be augmented by the substantial quantities of liquid contained in the underlying grooves. To counteract this, bridges 297 are raised in such a way that the polygonal path is equal to or very slightly in excess of the length of its arcuate path on the adjacent cylinders. This keeps the thread in position during passage over various annular members. It can be noted in any of Figures 19, 20, 21 or 22 that the upper surface of each bridge 297 is curved. Thus, the bridges rise in a gentle curve from a point flush with the surface of annular member 253 between the grooves to a point above that surface and then back down to the surface again. The advantage in this arrangement is that if a drop of water tends to creep across one of the bridges 297 and thus tends to move from one cylinder to an adjacent cylinder, its surface of contact with the bridge will necessarily be reduced as shown in Figure 14 when a portion of the surface of annular member 253 between adjacent grooves such as 293 and 294 in the illustration is contacted. This will cause the immediate discharge of the drop of liquid. The construction has been described in conjunction with annular member 253. The same arrangement, however, is used in all of the annular members.

In Figures 20 to 25, inclusive, there is shown a modified type of continuous spinning machine constructed according to this invention. The liquid treatment steps effected on this machine may be similar to those of the Figure 1 apparatus or may be varied in a manner to be hereinafter described.

Figure 20:
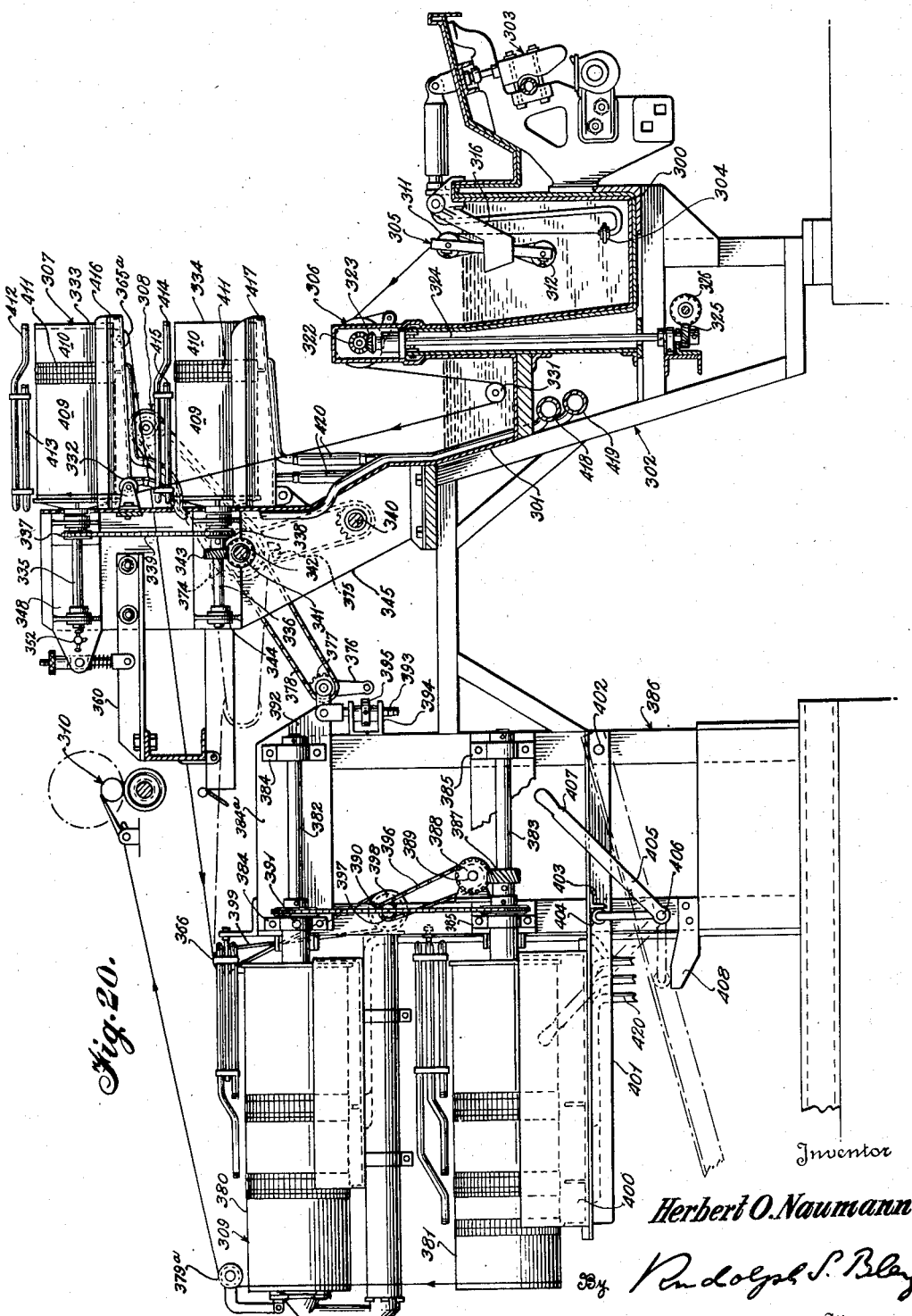
Figure 20 is an end view, partially in section, of a spinning machine constructed according to this invention but somewhat modified for convenient attachment to pre-existing spinning equipment.

As can be seen upon reference to Figure 20, the modified type of spinning machine is assembled in conjunction with a two-bath system in which bath troughs 300 and 301, their supporting framework 302, and spinning pump assembly 303 are adapted from a conventional two-bath spinning layout. Bath troughs 300 and 301 extend continuously for the entire length of the machine, pump units 303 being provided at spaced points along the length of trough 300, each to serve a spinneret 304.

In the modified type of apparatus now under discussion, the thread follows much the same course as in the machine of Figure 1. The thread leaving a spinneret 304 in trough 300 is passed over a long path guiding device 305 and godet 306. From godet 306 it may be led into the bath of trough 301, and from thence to a thread-storage, thread-advancing device indicated generally at 307 or it may be led directly to said device. After device 307 is threaded up, by winding a thread band adjacent the supported end thereof as described in connection with device 11 of Figure 1, the thread is led to a temporary collecting device 308 which is bodily moved to a position adjacent another thread-storage, thread-advancing device designated generally at 309. On this device further treatments are consummated. From there the thread is led to a collecting device indicated generally at 310.

Guiding device 305 is of particular utility in conjunction with the spinning of viscose yarns, and is used to prolong the period that each succeeding portion of the thread is immersed in the acid spinning bath. As an example, guiding device 305 may be used to further advance regeneration to thereby modify certain characteristics of the yarn as for instance strength, elongation, chemical composition in the following stages of the process. Structurally, guidance device 305 consists of two immersed grooved pulleys 311 and 312 mounted for free rotation on studs 313 and 314 which in turn are carried by a brace 315 mounted in a support 316 attached to the front edge of bath trough 300 and extending therein. When spinning is begun on the machine of Figures 20 and 21, device 305 is temporarily raised above the liquid level in trough 300 so that thread from the spinneret 304 is first led around pulley 311 and then pulley 312 and so on until all of the plural grooves of these pulleys are occupied. Thereafter, the device is restored to normal position immersed in the bath of trough 300.

The godet consists of two rollers 317 and 318, the former of which is driven while the latter is mounted for free rotation. Roller 317 is keyed at 319 to a shaft 320 which extends into a housing 321 supported from the adjacent edges of troughs 300 and 301. At the end of shaft 320, remote from the point of attachment to roller 317, gear 322 is attached. This gear meshes with a gear 323 at the upper end of a vertical shaft 324. The lower end of shaft 324 is also provided with a gear, the latter being designated by the numeral 325. Gear 325 is adapted to mesh with one of a number of gears 326, attached at spaced points along a drive shaft 327 which extends for the full length of the machine. Shaft 327 is driven by any suitable source of power, not shown, through a conventional P. I. V. transmission and is adapted to drive each godet roller 317 through its gear train 326, 325, 323 and 322.

Since godet roller 317 is adapted to operate in conjunction with liquid chemicals carried from the spinning bath by the thread, it is necessary to protect the driving gears therefor. To this end, roller 317 is provided with a raised annular flange 328, coacting with a flange 329 to protect its hollow interior from corrosive liquids. Within this protected zone a sleeve 330 is located, the sleeve being provided with anti-friction bearings for shaft 320. Since the sleeve is protected, liquid seepage into housing 321 is not possible. Hence gears 322 and 323, their respective shafts and the bearings therefor, operate in a protected zone.

Freely rotatable roller 318 is mounted on a stub shaft, the end of which is supported in housing 321. The godet 306 is threaded as a unit as shown in Figure 21, a number of convolutions being wound around rollers 317 and 318 to assist in preventing slippage. Note also that the surface of roller 317 is corrugated, also in furtherance of the prevention of slippage.

After the thread leaves godet 306, it may be led into a second bath located in trough 301, around an immersed freely rotatable roller 331 and then to thread-storage, thread-advancing unit 307 over guide roller 332. It will be understood that the threading arrangement shown in Figure 20 is merely exemplary showing the mechanical possibilities of the illustrated apparatus. It is evident that long path guiding device 305 may be used either with or without subsequent passage of the thread through bath 301. In the latter case, of course, the thread is led directly from godet 306 to thread-storage, thread-advancing device 307. Similarly, device 305 may be omitted and the thread led directly to godet 306 and from thence either through the bath or trough 301 or directly to thread-storage, thread-advancing device 307 dependent upon the particular chemical treatment undertaken. Regardless of the stretch to be imparted to the thread, it will be understood that godet 306 must be driven in timed relation with the spinning pump since stretching between spinneret 307 and godet 306 would have the effect of altering the denier of the thread. When device 305 is employed, however, there may be some slight stretch between that device and godet 306 since the pull from the godet, if not too great, will not be effective at the spinneret. If stretching is desired, however, the major portion thereof will be effected between godet 306 and thread-storage, thread-advancing device 307, the latter being driven at a takeup speed in excess of that of the former.

Thread-storage, thread-advancing device 307 is similar in structure and operation to the corresponding unit 11 of the continuous spinning machine of Figures 1 and 12. It is threaded up in the same manner and it will cause axial feed spaced connected coils of thread wound therearound. Unit 307 consists of two rollers 333 and 334 mounted on axially extending shafts 335 and 336 lying in the same vertical plane. Shafts 335 and 336 are supported at a common end and each being provided with a sprocket 337 and 338, respectively, through which they are connected by a chain 339 so that they may be conveniently driven at the same speed. The power source for driving rollers 333 and 334 through their respective shafts is a shaft 340 caused to rotate by any conventional means not shown. Shaft 340 is connected by a sprocket and chain drive to a shaft 341 which extends for the full length of the machine. At spaced points along the length of shaft 341, gears 342 are located, one being provided for cooperation with a corresponding gear 343 mounted for rotation with shaft 336. Thus, shaft 336 is caused to rotate and through chain 339 drives shaft 335 at an identical speed. Hence the peripheral speeds of rollers 333 and 334 will be identical.

It will be recalled that lower roller 22 of unit 11 is mounted with its axis extending truly horizontally while the axis of upper roller 21 extends generally horizontally but slopes in the direction of the unsupported end of the unit. This arrangement also prevails in conjunction with thread-storage, thread-advancing unit 307. The shaft 336 for lower roller 334 is mounted in anti-friction bearings 344 supported in fixed position from a plate 345 bolted to frame 302. On the other hand, shaft 335 is mounted for movement in a vertical plane so that the angle of convergence of the axes of rollers 333 and 334 may be varied to produce varying coil spacings of thread wound around the two rollers.

Figure 33:
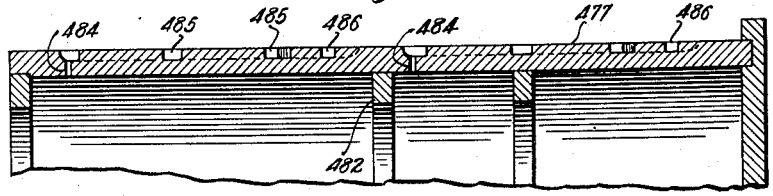
Figure 33 is a fragmentary view in longitudinal section of the lower roller of the unit of Figure 31.

The means for mounting and adjusting the position of shaft 35 is best shown in Figures 22 to 24, inclusive, to which reference is now made. It will be noted that shaft 335 is mounted in anti-friction bearings supported by projections 346 and 347 of a plate 348. Plate 348 is attached to support member 345 near the upper edge thereof and is arranged for limited pivotal movement with respect thereto so that the angular position of shaft 335 may be changed. The pivot point is one of the points of attachment of plate 348, namely a hollow screw 349 which is threaded into a nut 350 having an annular flange 351. Nut 350 is seated, with enough clearance to allow turning, in an aperture in member 345. (See Figure 33.) A locking screw 352 is threaded into the interior of screw 349 so that the latter is locked to nut 350. The bearing for the turning movement of plate 346 is therefore the aperture surrounding nut 350, while flange 351 acts as an axial thrust bearing. Inasmuch as plate 348 will be moved very slightly to cause critical adjustment of the angular position of shaft 335, and, since the machine will undergo long periods of operation between adjustments, it is essential that the adjustment, once made, be resistant to displacement. For this purpose a bolt 352 having a threaded shank 353 of reduced cross-section is provided for drawing support member 345 and plate 348 together. Shank 353 of bolt 352 passes through an arcuate slot at 354 in plate 348 and is threaded into an aperture in support member 345. Thus, when bolt 352 is drawn tight by the use of bar 355, plate 348 is firmly frictionally clamped between the shoulder of bolt 352 and support member 345, while unscrewing bolt 352 will release plate 348 for movement.

Figure 31:
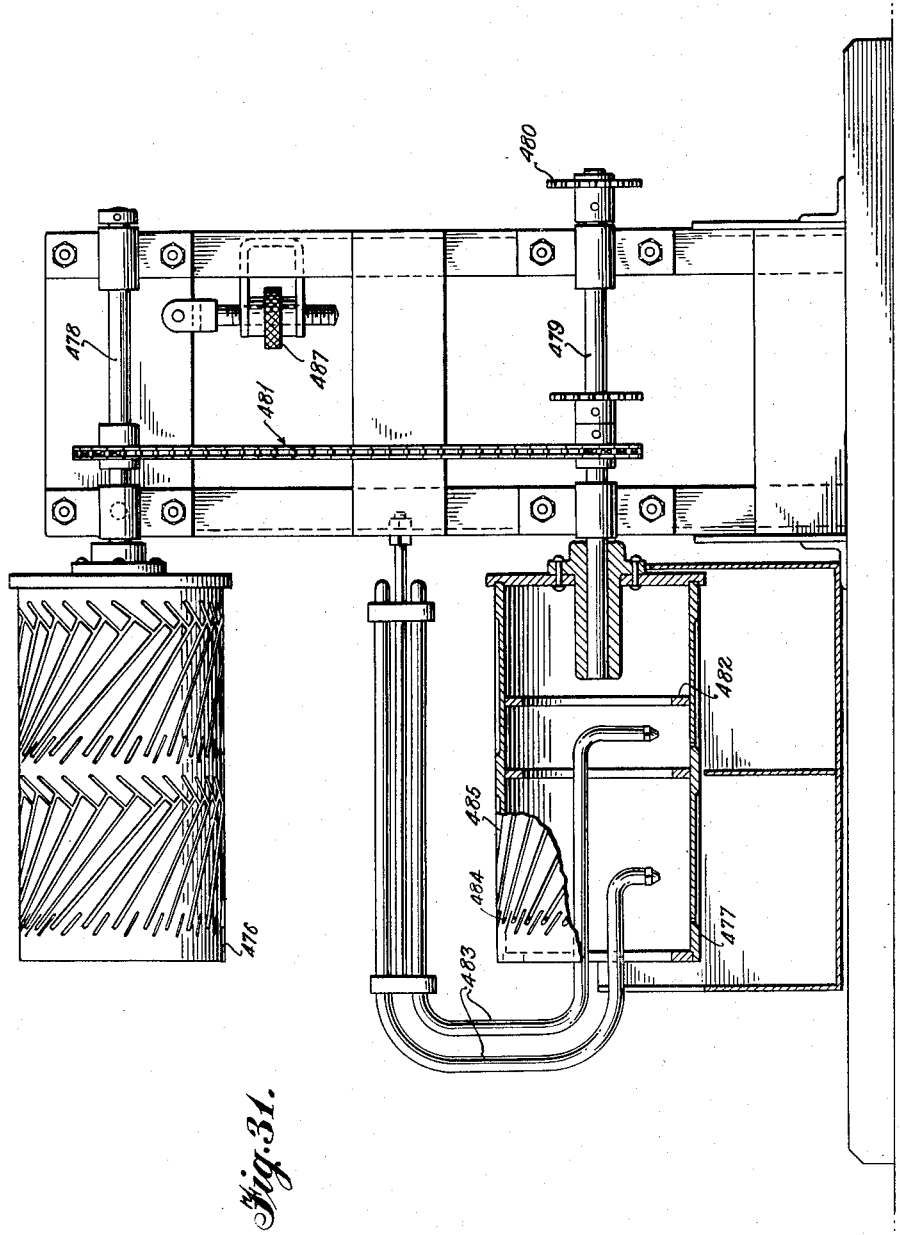
Figure 31 is a view partially in side elevation and partially in longitudinal section illustrating a further modified type of thread-storage, thread-advancing device involving a treating liquid freed from the interior of the unit.
Figure 32:
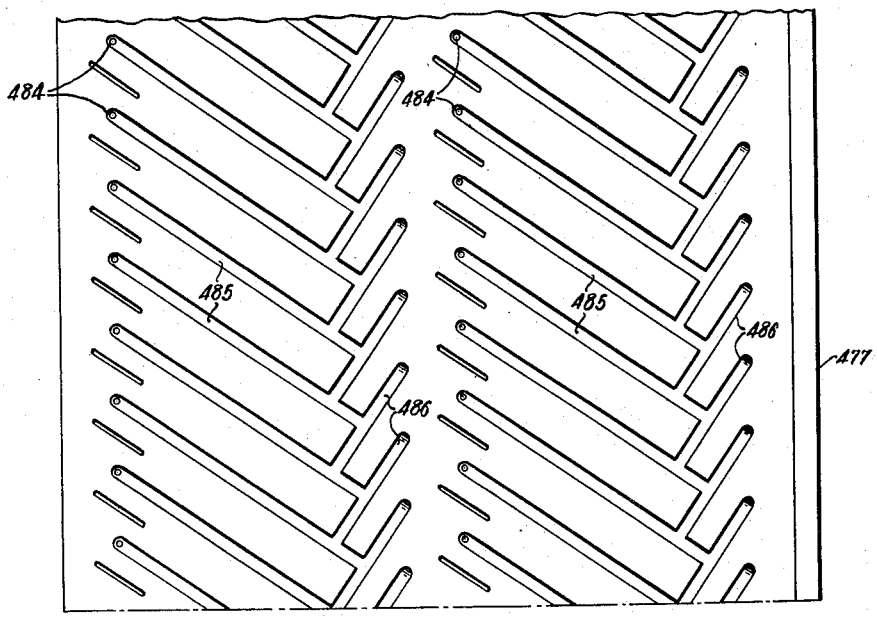
Figure 32 is a development of the grooved zones of a roller of the thread-storage, thread-advancing unit of Figure 31.

The movement of plate 348 about the pivot point at 349—350 is slight and must be subject to very exact control, while there must be sufficient mechanical advantage to allow for movement not only of plate 348 but all the instrumentalities carried thereby including roller 333. As a consequence, the end of plate 348 remote from roller 333 has bolted thereto a bifurcated member 356 the arms of which are apertured to receive studs 357 adapted to support a bored block 358 therebetween. Block 358 is adapted for pivotal movement between the arms of bifurcated member 356, while the central bore loosely receives a threaded rod 359. Rod 359 extends upwardly from a support 360, being attached thereto by a shouldered member 361. Between the shoulder of member 361 and block 358 a coil spring 362 is interposed, the thrust of which urges block 358 upwardly. Thus roller 333 is normally biased to extend with its unsupported end lower than the supported end. It is drawn to the desired position by compression of spring 362 which is effected through block 358 by an interiorly threaded cap 363 having an operating handle 364. The interior threads engage with the threads of rod 359 so that the mechanical advantage is great and the movement is gradual. It will be understood that during movement of cap 363 bolt 352 will be released. As shown in Figure 22, shaft 335 is horizontal. To bring about the desired convergence of the axis of the shaft and that of shaft 336 toward the unsupported end of unit 307, cap 363 will be unscrewed allowing spring 362 to move block 358 upwardly. It is clear that since the weight on the right side of the pivot at 350 is in excess of the weight on the left side, all as viewed in Figure 31, the function of spring 362 is primarily to keep block 358 from binding against rod 359. For this purpose a washer 365 is located at either end of spring 362.

Once the adjustment of the angle of shaft 335 has been effected in a manner to cause coil spacing in conformity with the time factor of the treatment effected on thread-storage, thread-advancing unit 307, that unit is threaded up in the manner previously described in conjunction with unit 11, see Figure 1. The thread is passed from roller 331 in bath trough 301 to roller 332 adjacent the supported end of unit 307. From this roller it goes onto the thread-storage, thread-advancing unit and it leaves that unit adjacent a roller 365a. The thread is led around roller 365 and from thence to a roller 366 disposed adjacent the supported end of unit 309. As is the case of the apparatus illustrated in Figure 1, the apparatus of Figure 20 comprises two units 307 and 308 which are disposed on opposite sides of the machine. Hence, it is difficult to pass the thread from roller 365a to roller 366 by solely manual means. As a consequence, a rocker arm 367 is provided for the purpose of moving a temporary collecting device 368 from a point adjacent the discharge end of unit 307 to a point adjacent the takeup end of unit 309. Arm 367 is mounted for pivotal movement about shaft 341, anti-friction bearings 369 serving to connect the two. Within the housing defining arm 367 a pulley 370 is located, connected by a V-belt 371 with another pulley 372. This pulley is keyed to a shaft 373 which likewise carries a temporary collecting device 368. Thus, the rotation of shaft 341 is carried over to temporary collecting device 368. In view of the fact that pulley 370 is somewhat larger than pulley 372, the peripheral speed of collecting device 368 is somewhat increased. The two connecting pulleys are so adjusted that the takeup speed of device 368 is just barely in excess of the delivery speed of rollers 333 and 334 so that the thread will not slack during a threading up operation. Upon reference to Figure 21, it will be seen that a pair of stops 374 depend from the lower edge of arm 367. These members cooperate with a stop 375 attached in any convenient manner to a portion of the machine frame so that arm 367 will, by gravity, always assume the same extreme positions, regardless of whether collecting device 308 is adjacent unit 307 or unit 309.

It can now be seen how temporary collecting device 368 is operated. To move that device from its position adjacent unit 307 to the broken line position shown in Figure 20 adjacent the supported end of unit 309, a crank 376 is operated, this crank causing rotation of a sprocket 377, which, through a chain 378, operates a sprocket 379 keyed to the housing bearings of arm 367. It can be seen that rotation of crank 376 will cause the desired movement to take place, the rocking of arm 367 being entirely independent of pulleys 270, which, of course, is keyed to shaft 341. Once the temporary collecting device 308 has been moved to the broken line position of Figure 20, the thread is broken adjacent that device and is led over roller 366 after which time the coils are wound around the rollers of unit 309 in the manner previously described in conjunction with thread-storage, thread-advancing unit 11. The thread shown leaving unit 309 is passed over roller 369a and from thence is led to collecting device 310 of any conventional type, the illustration of Figure 39 being diagrammatic and intended to include a thread supporting body driven at its periphery and used in conjunction with any conventional traverse mechanism; for example, of the type employed in coning machines.

The unit 309 is made up of two rollers 380 and 381, the axes of which lie in the same vertical plane and are convergent in the direction of the unsupported end of the rollers. As before, the axis of roller 381 is truly horizontal, while the axis of roller 380 slopes downwardly from right to left as it is viewed in Figure 20. Roller 380 and 381 are carried on shafts 382 and 383, respectively, supported in bearings 384 and 385 suitably attached in any convenient way to the left-hand main frame generally designated at 386. Bearings 385 are fixed, and shaft 383 carries a gear 387 which meshes with a gear 388 carried on a main drive shaft 389. Shaft 389 is similar in structure and function to shaft 341, a plurality of gears 388 being provided at spaced points along its length, one for coaction with each gear 387. In this regard, it will be understood that a gear 387 is associated with each unit 309. In a manner similar to the arrangement shown in conjunction with unit 307, roller 380, through its shaft 382, is driven from shaft 383. The drive is a chain and sprocket one indicated generally at 390.

Again in the interest of controlling the space between adjacent coils on the thread-storage, thread-advancing unit, the upper shaft 382 of unit 309 is rendered angularly adjustable. The adjustment is effected by pivotally attaching a plate 384a, which supports bearings 384, at a point 391. Pivoted plate 384a is provided, at a point remote from pivot point 391, with an extending portion 392 onto which a threaded rod 393 is pivotally attached through a bifurcated member. Threaded rod 393 passes through a bifurcated bracket 394 fixedly attached to main frame 386. Within the arms of bracket 394 a hand nut 395 is located. It can be seen that by turning nut 395, the length of threaded rod 393 between that nut and the point of pivotal attachment to projecting portion 392 is varied and that the effect of this variance will be to tilt the plate carrying bearings 384 in which shaft 382 is lodged.

It should be noted that the point of pivotal movement of roller 380 and its shaft 382, as well as the corresponding point of movement of roller 333 and its shaft 335, is extremely close to the sprocket wheel through which the driving connection is effected. The advantage of this is, of course, reduction of the amplitude of displacement of the driving sprocket upon adjustment of the angular disposition of the particular roller. In both cases, the displacement of the sprocket will be so slight as to cause no interference with the chain drive of the upper rollers from the lower ones.

A small sprocket located rearwardly of gear 388 drives a chain 396, which in turn drives a sprocket 397 carried on a stub shaft. The stub shaft also carries a pulley 398 which is connected by a belt 399 to a pulley mounted on a stub shaft with roller 366. Thus, roller 366 is driven through connections so adjusted that it has a takeup speed just a little in excess of the delivery speed from unit 307. This assists in threading up when the closed coil is wound near the unsupported end of unit 309 in a manner hereinbefore described. If unit 309 is threaded up by winding a closed coil adjacent the supported end of component rollers thereof, there may be some difficulty in conjunction with bath trough 400. As a consequence, that trough is supported on a bar 401 which is pivoted at 402 to main frame 386. Approximately midway between pivot point 402 and the free end of trough 400 an L-bracket 403 is attached to bar 401. Against this bracket a roller 404 is normally pressed through a bell crank 405 pivoted at 406 to a portion of frame 386. Roller 404 is attached at the free end of one arm of the bell crank while the free end of the arm is provided with an operating handle 407. When operating handle 407 is moved forward as viewed in Figure 20, trough 400 is lowered to the broken line position. The movement is limited by a stop 408 extending from a portion of frame 386.

It is contemplated that a device for tilting the trough under roller 334 likewise be provided. Of course, the lower troughs in Figure 20 may be stationary and the short trough arrangement previously described in connection with Figure 1 can then be used.

The liquid treatments effected on units 307 and 309 may be analogous to or identical with the treatments effected on units 11 and 12 as previously described. It is contemplated that rollers 333 and 334 be provided with two grooved areas 409 and 410, the grooves of which correspond in structure and function to the grooves previously described in conjunction with unit 11. Also, a bridged separation zone 411 is provided intermediate the treatment zones. The treating liquids are supplied through pipes 412, 413, 414 and 415 to rollers 333 and 334. A partitioned collecting trough 416 underlies roller 333 and a similar trough 417 is associated with roller 334. As is the case in connection with previously described apparatus, the partitions are located at the center of the bridged separation zones 411 so that the liquids from pipes 413 and 415 are separately recovered from those of 412 and 414. To this end, each section of each trough is connected by a pipe with a manifold return pipe for the particular liquid collected in and drained from that section. Thus, return pipe 418 accommodates the liquids sprayed from pipes 413 and 415 which are collected on the left side of troughs 416 and 417 as viewed in Figure 20 while return pipe 419 functions similarly with respect to the right side of said troughs. Pipes 418 and 419 are connected to a source of liquid supply, not shown, so that the liquid may be re-run and again sprayed out from pipes 412—414 and 413—415. The supply and discharge arrangements in connection with unit 307. It will be understood that the pipes underlying troughs 400 and 417 will be provided with flexible connections 420 so that the tilting of the troughs may be accomplished without disconnecting the lead lines.

Figure 34:
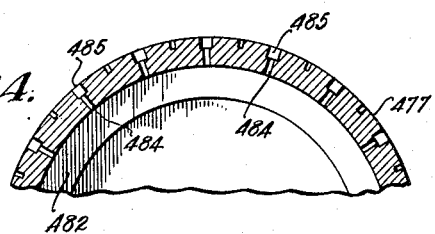
Figure 34 is a fragmentary view thereof in transverse section.

Although the surface structure and the separation zones of units 307 and 309 are similar to units 11 and 12, the detailed structure of the roller is somewhat distinct. Upon referring to Figure 34, the detailed structure of the component rollers of unit 309 is shown. It can be seen that shaft 382 is keyed at 421 to a hub 422 of a spider 423 having an annular flange 424 and an extending cylindrical portion 425. Cylindrical portion 425 is provided with threaded sockets 426, only one of these being shown in Figure 34 although several are contemplated in the structure in use. Socket 426 receives the threaded end of a rod 427 which passes through a hole in a flat ring 428 and is held against that ring by a nut 429. It can be seen that by operation of a nut 429, ring 428 can be drawn closer to spider 423. Thus, ring 428 acts as a follower for holding cylindrical sections 430, 431, 432 and 433 in place. Section 430 is tubular and defines a cylinder open at its ends. The internal diameter is such that it will slip over the outer cylindrical surface of the cylindrical portion 425 extending from spider 423. So that the connection may be made tight, packing 434 is interposed. As illustrated, cylinder 430 is intended as the desulphurizing zone in the treatment of viscose thread and, as a consequence, is not provided with grooves, this structure being similar to that of the corresponding zone of unit 12. Separation zone 431 is an annulus provided with grooves in the outer surface and shoulders 435 and 436. Cylinder 430 fits over shoulder 435 and cylinder 432 fits over shoulder 436. Internally, section 431 is in the form of a spider 437 having a hub 438 in which the end of shaft 382 is received. The structure and function of the surface grooves in section 431 corresponds to that of the respective portion of unit 12 and need not be described again. Bridges traverse the grooves for the reasons hereinbefore discusseed. Section 432 is cylindrical in form and is similar to section 430 except that it is of lesser axial length and is provided with surface grooves for the distribution of liquid thereover. As has been stated before, one end of cylindrical section 432 fits over shoulder 436 of section 431. The other end fits over a similar shoulder 439 of section 433, that section also being provided with a shoulder 440 against the end of which ring 428 is drawn. The surface of the shoulder supports a heating cylinder 441. This cylinder is provided with an electric heating element 442, the structure and operation of which is described in Patent No. 2,244,745. It will be seen that cylinder 441 is pressed on over shoulder 440 of section 433. Directly behind the heating element 442, a portion of cylinder 441 is perforated at 443 so that the heat from the left end of cylinder 441 as viewed in Figure 34 will not be carried over to the grooved zone at the right end of the cylinder. These perforations provide for the passage of air and are similar to the corresponding portion of the upper roller of unit 12. The grooves provided also have a similar function. Lower roller 381 of unit 309 is held together in the same manner as upper roller 380. It consists, however, of one additional section 444 which is used for the application of a sizing registry with the portion of section 441 which is separated from the heater by perforations 443. Thus, the sizing applied at section 444 will not be dried prematurely as the thread passes over the right-hand portion of section 441 on the upper roller of the unit.

Figure 26:
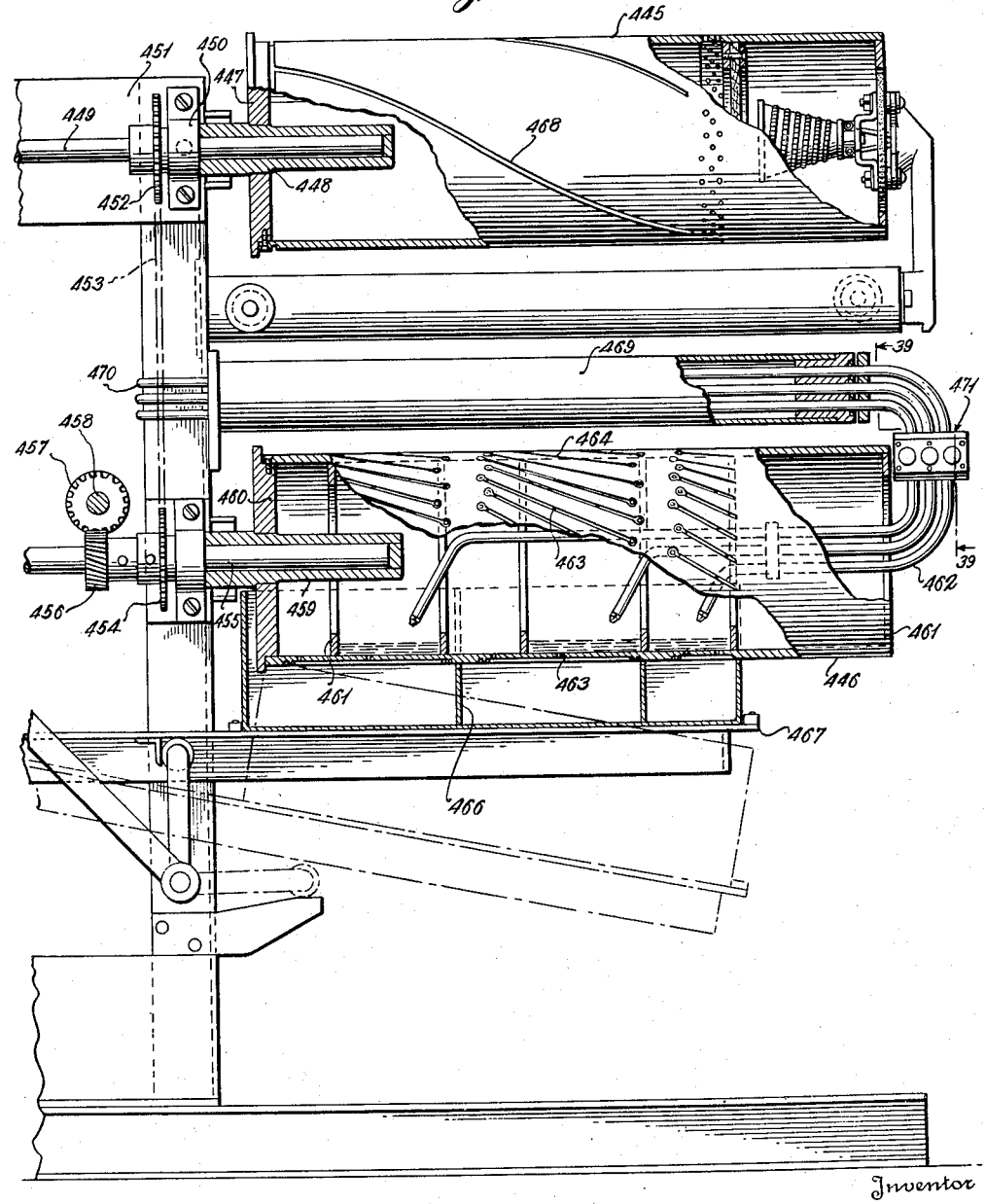
Figure 26 is a view partially in side elevation and partially in longitudinal section illustrating a modified type of thread-storage, thread-advancing device involving a treating liquid feed from the interior and exterior surface distribution thereof.
Figure 27:
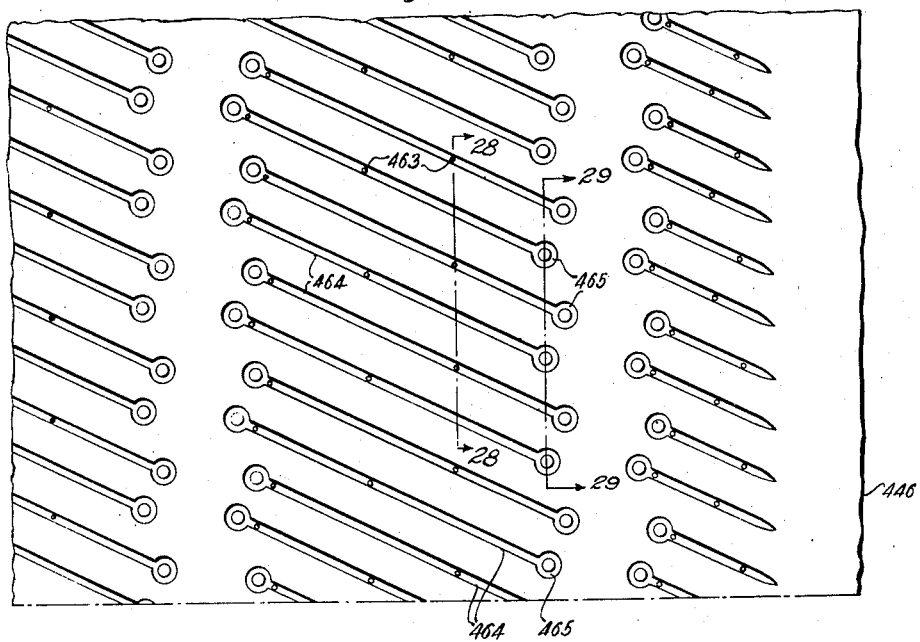
Figure 27 is a development of the grooved zones of the lower roller of the thread-storage, thread-advancing unit of Figure 26.
Figure 28:
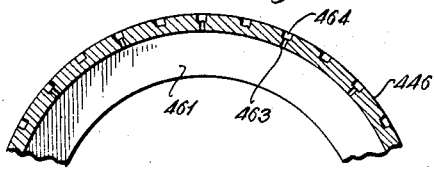
Figure 28 is a fragmentary view in section taken along the lines 28—28 of Figure 27.

Referring now to Figures 26 to 30, inclusive, there is shown a thread-storage, thread-advancing device constructed according to the present invention which involves modified means for applying liquid treatments to the thread passing thereover and a modified structure for causing the discharge of the liquids from the rollers at the desired point. A unit involving such modifications is shown in Figure 26 and consists of an upper roller 445 and a lower roller 446, both being cylindrical in form and adapted to be driven. Roller 445 is provided with an annular plug 447 at one end, a central opening in said plug receiving a sleeve 448 to which a shaft 449 is keyed. Shaft 449 is provided with a bearing at 450 which is attached to a support plate 451. Shaft 449 has keyed thereto a sprocket wheel 452 which is connected by a chain 453 to a similar sprocket wheel 454 located on a shaft 455 which is driven by a gear 456 from a gear 457 on a main drive shaft 458. It is contemplated that the main drive shaft 458 will be provided with a number of gears 457, each serving a thread-storage, thread-advancing cylinder 446. A sleeve 459 similar to sleeve 448 is keyed to shaft 455 and also to a plug 460 which closes the end of roller 446. Sprocket wheels 452 and 454 are the same size so that rollers 445 and 446 will have the same peripheral speed, both being driven from shaft 458.

Figure 29:
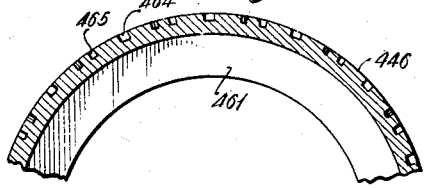
Figure 29 is a fragmentary view in section taken along the line 29—29 of Figure 27.
Figure 30:
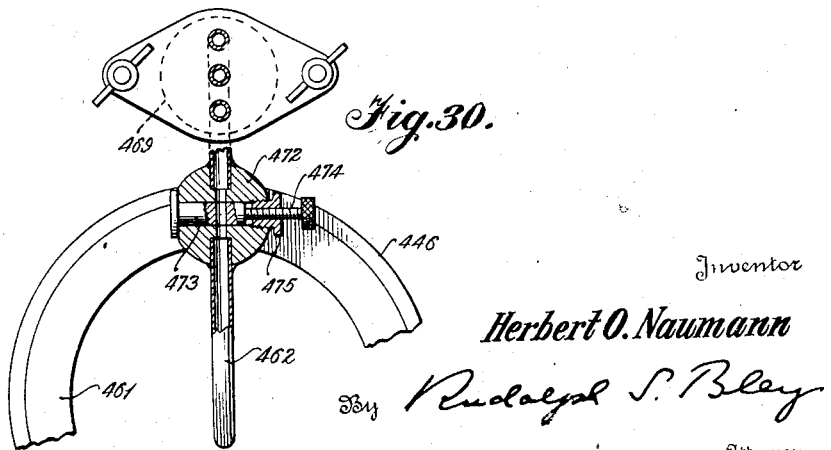
Figure 30 is a view partially in section and partially in elevation taken along line 30—30 of Figure 26.

It will be noted that rollers 445 and 446 differ from the rollers of the previously described units in that they are unitary in structure rather than composed of a plurality of interfitted replaceable sections. Interiorly, roller 446 is provided with a plurality of annular flanges 461 dividing the interior into a number of zones of differing axial lengths. A plurality of spray pipes 462 extend into cylinder 446 from the unsupported end thereof which is open except for its annular baffle 461. Each pipe 462 is led to a different treatment zone. Between the annular partitions 461, the cylinder 446 is provided with apertures 463 extending from the interior thereof to the outside surface, these apertures being in registry with the bottom of grooves 464 as can be seen in Figure 37. Thus, when liquid is supplied through pipes 462, it tends to collect in the bottom of the cylinder between the partitions 461 and leaks through apertures 463 by gravity. The liquid is distributed by grooves 464 in the same manner as in connection with some of the previously described grooves. As before, the lengths of the grooves control the length of the treatment zone. However, the boundaries of the treatment zone are determined, not by annular grooves which extend around the cylinder in planes at right angles to the axis thereof, but rather by the small annular grooves 465, see Figure 27, located at the extremities of each groove 464. Annular grooves 465 define cups, as can be seen in Figure 29. Since these cups allow the accumulation of a greater mass of liquid than that which is accumulated in the grooves and since the peripheral speed of the roller is the same at the cupped area as at the grooved area, discharge of the liquids will occur by centrifugal force, the discharge being in a plane normal to the axis of cylinder 446. In the spaces between cupped areas there will be substantially no liquid travel except for very slight amounts carried by the thread. As a consequence, partitions 466 and collection pan 467 are located in areas between cupped zones. Of course, so that partitions 466 may be effective, annular grooves 465 are disposed about the surface of the cylinder in an annular path lying substantially at right angles to its axis. Thus, the liquid supplied to each of the three grooved zones of roller 446 may be separately collected without adulteration.

The arrangement shown in Figure 26 is operative where the chemistry of the thread aftertreatment does not require the application of liquids in a large quantity. If, for example, an aftertreatment requires but the reaction with two or three liquids, the device of Figure 26 is quite satisfactory. The zones, however, must be longer than the corresponding zones of the rollers described in Figures 5 and 6, and for this reason the modification of Figure 26 cannot be used where there are a large number of aftertreatments for, otherwise, the length of the roller would have to be extended beyond practical limits imposed by the laws of mechanics. Thus, the modification of Figure 26 cannot be considered an equivalent of the preferred form illustrated in the previous figures, particularly since liquid flow in quantity may result in some admixture on the roller. Aside from the method of feeding and discharging liquids from the surface of roller 446, the apparatus of Figure 26 is similar to the embodiments previously described. Drip pan 467 can be lowered during threading up in the same manner as the corresponding drip pan on unit 309, see Figure 20. As a consequence, the apparatus need not be discussed again. The heating means applied to roller 445 is also similar to the arrangement previously described. It will be noted that upper roller 445 is provided with helical grooves 468, the function of which is to move liquids upwardly against the action of gravity toward the supported end of the unit. Grooves 468 function to prevent liquid creepage and to counteract the effect which the thread has of carrying the liquid along with it. No treating liquid is applied to the thread on roller 445. Hence that roller is not provided with holes except at a cooling zone.

The feed pipes 462 leading to the interior of roller 446 are supported in a housing 469 held by U-bolts 470 to a portion of the main frame of the machine. They are led through a multiple valve device 471, one unit of which is shown in Figure 39. A valve casing 472 is provided for each pipe 462 and within this casing a valve member 473 is mounted for sliding movement. A screw 474 is pivotally connected to valve member 473 and extends co-axially thereof. Screw 474 is threaded into a plug 475 which in turn is threaded into housing 472. Thus, by rotation of screw 474 in a plug 475, valve member 473 can be moved axially to allow for separate control of the liquid supply to each of the interior zones of roller 446.

Still another modification of the present invention is illustrated in Figures 31 to 34, inclusive. Again, but a single thread-storage, thread-advancing unit is shown. It is contemplated, however, that a plurality of such devices be arranged in alignment to be driven from a common source, one arranged to serve each spinning place. As before, the unit in question consists of an upper and a lower roller designated, respectively, in Figure 40 by numerals 476 and 477. These rollers are mounted on shafts 478 and 479, respectively, driven from a sprocket 480 keyed to 531 provided with a partition 532 in registry with the center of separation zone 530. The trough 531 on one side of the partition 532 is drained by a pipe 533 while the other side is drained by a pipe 534. It is contemplated that the outlets of these pipes will be connected with any type of flexible tubing which in turn will be connected to main recirculation pipes which will lead the recovered chemicals to a point where correction, regeneration and heating may be accomplished. In threading up, troughs 531 will interfere with the passage of coils around the bottom of roller 526. Thus, trough 531 is provided with a U-bar 535, the transverse portion of which is affixed to the underside thereof at a point adjacent the supported end of roller 526. The shanks of U-bar 535 are provided with registering apertures and a bolt 536 is passed through them and through a bored portion of a frame supported block 537. In this way, trough 531 is pivotally attached to a portion of the main frame of the spinning machine. The under surface of trough 531 has depending therefrom a bifurcated member 538 at a point remote from the point of pivotal attachment of the trough to the main frame of the machine. The arms of bifurcated member 538 are provided with registering aperture which receive a bolt 539 on which a bell crank 540 is pivoted between the two arms. Bell crank 540 is provided with an operating handle 541 at the end of one arm and is pivotally connected between two arms 542 by a pin 543 near the end of the other arm. Arms 542 are pivotally connected between the arms of U-member 544 which is affixed to a portion of the main frame. The extreme end of the arm of bell crank 540 which is pivotally attached at 543 to members 542 has extending thereacross a stop plate 545, see Figure 39, of a width sufficient to contact the upper surface of both of the members 542. The effect of this is that the weight of trough 531 tends to rock bell crank 540 in a counterclockwise direction as it is viewed in Figure 37. Thus, plate 545 is pressed tightly against bars 542. In this connection it is important to note that the left arm of bell crank 540 and bars 542 are not in alignment and that pivot point 543 is below a dead-center position. When the trough is to be lowered, bell crank 540 is rocked about pivot 539 in a clockwise direction making pivot point 543 into an elbow joint so that the front end of the trough may be lowered.

Figure 40 depicts a chemical flow sheet showing a typical treating liquid supply and circulation system used in conjunction with the novel continuous spinning machine. The viscose solution is extruded through spinning nozzle 10 into an acid spin bath 749 to form a coagulated thread therein which is led over godet 31 to the thread-advancing, thread-storage device 11. The thread is treated on cylinders 212 and 209 with hot water or hot acid of a temperature of about 80° C. by means of pipes 231 and 233 and thereupon on cylinders 210 and 213 with water of a temperature preferably of about 60 to 70° C. supplied by pipes 232 and 234. The thread is then led to treatment cylinders 248 and 263 on which it is desulphurized with a solution supplied by pipes 270 and 273 through pipe 738. The desulphurizing solution comprises preferably a 3.5% aqueous solution of sodium sulphite maintained at a temperature of about 80° C. The desulphurized thread is then treated on cylinders 250 and 266 with water of a temperature preferably of about 60 to 70° C. supplied by pipes 269 and 272 to remove residual sodium sulphite therefrom. The washed thread is then sized on cylinders 265, the size being supplied by pipe 271 through pipe 739. Any conventional textile finishing solution or emulsion may be used for this purpose. The finished thread is then dried on cylinders 251 and 264 and thereupon led to twisting device 13. When it is desired to spin high-strength yarn the coagulated thread is led from the spinning nozzle 10 over godet 31 into bath 750, this bath comprising either hot water or hot acid. The thread is let through bath 750 by means of roller 35 submerged therein. Overflowing bath 750 is led through overflow pipe 742 to sewer 751. After leaving bath 750 the thread is led to the thread-advancing, thread-storage device 11. The thread is stretched in bath 750 with a simultaneous regeneration of the viscose thread coagulated in bath 749. The acid spin bath 749 is prepared in tank 706 and forced by means of pump 711 and pipe 716 to the top of elevated tank 701. The acid is passed through a gravel filter 722 and manifold 732 into the lower portion of tank 701 in which it is brought to the proper temperature by heater 725. The acid is then led from the bottom of tank 701 through pipe 740 to the spin trough containing the submerged spinnerette 10. Spin bath 749 becoming depleted in acid during the spinning operation is led through pipe 745 into tank 706 in which it is brought back to normal acid and salt concentration by suitable means not shown. Thus it will be clearly seen that the spin bath is continuously recirculated in a closed system. The hot water (preferably about 80° C.) is prepared in tank 707 and pumped into the top portion of elevated tank 700 by means of pump 712 and pipe 717. The water passes through gravel filter 721 and manifold 731 into the lower portion 723 of tank 700 in which it is brought to the proper temperature by means of heater 724. The water is then led from tank 700 through pipe 733 to spraying pipes 231 and 233. The waste water flowing from cylinders 209 and 212 is collected and led into tank 707. The hot water is therefore circulated in a closed system. Instead of using hot water in tank 707 it is also contemplated in accordance with the present invention to use a hot acid in order to effect a more complete regeneration of the coagulated thread on treatment cylinders 209 and 212. Water or acid dripping from treatment cylinders 209 and 212 is collected and led back through pipe 744 to tank 707 and recirculated through the system. The fresh water is heated in tank 702 by means of heater 726. The heated water (preferably about 60 to 70° C.) is led through pipe 734 to spraying pipes 232 and 234. Waste water dripping from cylinders 210 and 213 is led off through pipe 743 to sewer 751. Fresh water is supplied through pipes 735 and 736 and measuring device 729 to tank 702 to maintain the water therein at a constant level. In accordance with the present invention it is also contemplated to lead the heated water from tank 702 through heating device 720 and pipe 741 to make up bath 750. The purpose of heater 720 is to raise the temperature of the water in tank 702 preferably to about 80° C. when spinning high-strength yarn. The desulphurizing solution is prepared in tank 709 and led into the top portion of elevated tank 703 by means of pump 714 and pipe 719. The solution is heated in this tank to a temperature of about 80° C. by means of heater 727 and fed to the spraying pipes 270 and 273. The desulphurizing solution dripping from cylinders 248 and 263 is fed back into tank 709 through pipe shaft 479 which is connected to shaft 478 by a chain and sprocket system designated generally at 481. Roller 477 is hollow and is subdivided into interior zones by baffles 482. Into each zone a liquid is led by a pipe 483 and the liquid passes through apertures 484, see Figure 33, to the exterior surface of the roller. As was the case in conjunction with the structure of Figures 26 to 30, inclusive, the apertures are in registry with grooves, the grooves serving to move the liquids axially along the rollers in the direction of their supported ends. The discharge zone shown in Figures 31 to 34, inclusive, differs, however, from the corresponding zones of the previous embodiments of the invention. Note that the grooves designated by the number 485 in Figures 31 to 34, inclusive, intersect at right angles with throw-off grooves 486. Since the tendency of groove 485 is to move the liquid in the direction of the supported end of the unit while the tendency of intersecting groove 486 is to move the liquid in the opposite direction, it is evident that liquid will accumulate at the point of intersection. This will increase the mass factor and cause discharge of the liquid from the roller at that zone. Although upper roller 476 is exteriorly grooved in the manner of roller 477, the grooves have a somewhat different function since no liquid is supplied to the interior of roller 476 and no apertures are provided therein. The grooves in roller 476, therefore, serve only to counteract a tendency toward liquid creepage in the direction of slope of the roller. Thus, the effect of the grooves in roller 476 is to maintain liquid entrained by the thread in a zone in vertical registry with the corresponding application zone of roller 477. The modification of the invention shown in Figures 31 to 34, inclusive, is subject to much the same limitations as those mentioned in connection with the construction of Figure 26, namely, the arrangement is satisfactory for the operation of two or more liquid zones where the liquid is not supplied at a rapid rate or in large amounts. An adjusting screw 487 is provided for the purpose of changing the angular position of roller 476. The arrangement disclosed is identical to that associated with unit 309 shown in Figure 20. As a consequence, further description at this point is deemed unnecessary.

Now referring to Figures 35 and 36, there is shown a two-unit thread-storage, thread-advancing device of a construction similar to that of Figure 1. An upper roller 509 and a lower roller 510 constitute the unit. The surface and the construction of the bridged separation zones of rollers 509 and 510 may be similar to the corresponding portions of rollers 126 and 127 disclosed in Figure 1 and hereinbefore previously described. Rollers 509 and 510 are provided with liquid supply pipes 511, 512, 513 and 514 having discharge jets directed at the surface of the respective rollers in a manner which may be seen upon consideration of Figure 29. As is the case with roller 127, shown in Figure 1, lower roller 510 is provided with an additional treating liquid supply pipe bearing the numeral 515 and intended to function similarly to the corresponding pipe shown in Figure 1. Since pipe 515 is for the application of a sizing material, no corresponding element is necessary in connection with roller 509. Partition drain troughs 516 and 517 underlie the various treatment zones on rollers 509 and 510, respectively. These serve to collect the liquid distributed over the surface of the rollers and to return them to a point of regeneration from whence they may be recirculated to treating position. Inasmuch as the structure of roller 509 forms no part of the modification now described, the bearing structure and driving means therefor have not been illustrated. It is to be understood that any of the previously described structures may be adapted to roller 509. Roller 509 is provided with a heating element 518 similar in structure and function to that described in conjunction with roller 126.

It has been hereinbefore stated that the accurate control of the temperature of liquids supplied to threads passing over a thread-storage, thread-advancing device is often of critical importance. Thus, the liquid supplied to roller 510 from pipes 513 and 514 through their respective nozzles will be preheated to a critical value before ejection. However, it is difficult to fully insulate pipes 513 and 514 and there is necessarily some slight temperature loss during transmission of the liquid from its source of supply to its point of delivery. To compensate for this, a helically coiled electric heater of the resistance type designated by the numeral 519 is located within the hollow interior of roller 510. Heating unit 519, when electrically energized, will radiate heat to the inner surface of roller 510, whereupon the material of said roller will transmit the heat by conduction to the outer surface thereof. The heat delivered by heater 519 can be very accurately controlled so that the surface of roller 510 may be preheated to any critical value thereby maintaining the thread and the liquid supplied to the roller at a temperature dictated by chemical necessity. In order to supply electricity to heater 519, a cable 520 is passed into the interior of roller 510 through an aperture in its unsupported end. Since it is desirable that heater 519 and its cable 520 remain stationary, while roller 510 is rotating, bearings 521 and 522 are interposed between the rotating and stationary parts. In the interest of protecting cable 520, a housing 523 surrounds the same for its entire path of travel within roller 510. Cable 520, without roller 510, is led through a protective pipe 524 into a main electrical housing 525 which serves not only heater 519 for roller 510 but likewise drying element 518 for roller 509.

In conjunction with Figure 20, a trough 400 is illustrated, which trough may be moved into and out of collecting position beneath roller 381, the purpose being to facilitate threading up of that roller. A modified form of construction adapted to the same purpose is illustrated in Figures 37 to 39, inclusive. For convenience of illustration, only a single roller is shown and this is of the type used on the right-hand side of the machines of Figures 1 and 13. It is to be understood that this construction may be incorporated in either of these machines. Only the lower roller is shown, it being evident that the troughs associated with the upper roller cannot interfere with threading up since a closed coil need not be wound underneath the upper roller. The single roller illustrated in Figures 37 and 38 is designated by the numeral 526 and is supported and driven by any of the previously described means through a shaft 527. It is contemplated that the roller be divided into two treatment zones 528 and 529 involving grooves of the type illustrated in Figure 5. Likewise a bridged separation zone 530 between the treatment zones 528 and 529 is contemplated. Through supply pipes, not shown in Figures 37, and 38, liquids are sprayed upon zones 528 and 529 and are recovered in a trough 746. Thus the desulphurizing solution is constantly circulated in a closed system. Spraying pipes 269 and 272 are supplied with fresh hot water through pipes 735 and 737 from a hot water supply source not shown. The water dripping from cylinders 250 and 266 is led through pipe 748 into tank 705. The water in tank 705 is fed through pump 710 and pipe 715 into tank 702. Since the water dripping from cylinders 250 and 266 is slightly alkaline it is led through tank 705, pump 710 and pipe 715 to tank 702 for the purpose of being used on treatment cylinders 210 and 213 for reasons of economy. The textile finishing solution or emulsion of any known composition is prepared in tank 708 and fed by means of pump 713 and pipe 718 into the elevated tank 704 where it is heated by means of heater 728 and then supplied to spraying pipe 271. Excess size dripping from cylinder 265 is led into tank 708 through pipe 747. Thus the finishing solution is circulated in a closed system. The thread is dried on cylinders 251 and 264 by means of a heating device inserted into cylinder 251. The temperature of cylinder 251 is adjusted to produce a yarn having a desired moisture content, e. g., about 11% based upon the cellulose content of the yarn.

Although use may be made of any conventional spin bath for coagulating the extruded viscose threads the spin bath 749 preferably comprises about 150 to 216 grams of sulphuric acid, about 80 grams of magnesium sulphate and about 7 grams of zinc sulphate per liter of water, the temperature of this bath being preferably maintained at a temperature of about 43° C. Although any known desulphurizing agent may be used in the process it is preferred to employ a desulphurizing solution containing about 35 grams of sodium sulphite per liter of water since it has been found that this solution, when maintained at a temperature of about 80° C., will substantially completely desulphurize the thread. Although the water and/or acid on cylinders 209 and 212 or in trough 34 may be used at a temperature below and above 80° C. (about 60 to 90° C.), it has been found that the optimum results are obtained when these baths are maintained at a temperature of about 80° C. Since it is necessary to control accurately the temperatures and concentrations of all of the solutions used in the foregoing process in order to obtain a continuously spun thread, it is necessary to provide a series of automatically operating control devices. These devices are indicated by numeral 730. The pumps 710, 711, 712, 713, and 714 are automatically controlled by the level of the solution present in tanks 705, 706, 707, 708, and 709. In addition, it is of course necessary to constantly control the concentrations and compositions of the various treatment bath by chemical analysis at regular intervals of time.

I wish to emphasize that the process may be modified to allow wet spinning of any other synthetic thread. Thus it is possible, with adequate changes of the treatment baths, to spin cuprammonium solutions, solutions of cellulose esters, polymerized hydrocarbons and derivatives thereof, etc. Modification of the process and the apparatus will readily be foreseen by those skilled in the art, and I desire to include all modifications and variations coming within the scope of the appended claims.

This is a continuation in part of my application Serial No. 450,934, filed July 14, 1942, entitled "Process and apparatus for the manufacture of synthetic yarn."

I claim:

1. Apparatus for the aftertreatment of rayon yarn comprising, a thread supporting and advancing unit consisting of two generally cylindrical rollers, the axes of which lie in intersecting planes, one of said rollers being subdivided by a plurality of annular grooves into a plurality of spaced axially aligned cylindrical treating zones, means for supplying a treating liquid to each treating zone, and circumferentially spaced bridges extending across each groove to permit passage of the thread from one end of the device to the other, without interruption, in the form of connected coils, the grooves serving to separate the treating zones and prevent intermixing of the liquid supplied to one zone and the liquid supplied to the next adjacent zone.

2. Apparatus for the aftertreatment of rayon yarn comprising, a thread supporting and advancing unit consisting of two generally cylindrical rollers, the axes of said rollers lying in a single vertical plane and being convergent, said rollers being subdivided by a plurality of groups of annular grooves into a plurality of spaced axially aligned cylindrical treating zones, means for supplying a treating liquid to each treating zone, and circumferentially spaced bridges extending across each group of grooves to permit passage of the thread from one end of the device to the other without interruption in the form of connected coils, the grooves serving to separate the treating zones and prevent intermixing of the liquid supplied to one zone and the liquid supplied to the next adjacent zone.

3. Apparatus for the aftertreatment of rayon yarn comprising, a thread supporting and advancing unit consisting of two generally cylindrical rollers, the axes of said rollers lying in a single vertical plane and being convergent, each roller being subdivided by at least one group of at least three annular grooves into spaced axially aligned cylindrical treating zones, means for supplying a treating liquid to each treating zone, and spaced bridges extending across each group of grooves, the surface of the bridges lying very slightly above the surface of the cylindrical treating zones to permit passage of the thread from one end of the device to the other without interruption in the form of connected coils of equal length, the grooves serving to separate the treating zones and prevent intermixing of the liquid supplied to one zone and the liquid supplied to the next adjacent zone.

4. Apparatus for the treatment in transit of threads comprising, two rollers, the axes of which lie in intersecting planes, means for driving the rollers at the same speed to cause thread wound therearound to progress axially thereof in the form of spaced coils, the thread contacting surface of one of said rollers being composed of a plurality of interchangeable sections each defining an annular treating zone of predetermined length, the surface of at least one section being provided with a plurality of helical grooves for the distribution of liquids axially thereof, a plurality of means responsive to rotation of the roller, the surface of which is constituted of a number of sections for causing liquid discharge in a plane at a right angle to the axis thereof, at least one of said means lying intermediate adjacent sections to prevent transfer of liquids from one section to another, and stationary means for supplying a treating liquid to the surface of at least two adjacent sections, the helix angle of the grooves of the grooved sections being a function of the speed of liquid distribution axially therein.

5. Apparatus for treating thread comprising a thread-advancing thread-store device comprising a pair of spaced rotors to which the thread is directed and along which the thread advances horizontally in the form of a single layer of travelling helices, means to apply a plurality of thread-treating liquids to at least one of said rotors, at least one zone of each rotor to which liquid is applied having means integral therewith by which the liquid applied thereto is caused to flow longitudinally thereof, said rotor having annular grooves therein at the end of each such zone to arrest the flow of liquid along said rotor, whereby the integrity of the treating liquids applied to the rotor is preserved, and means bridging the grooves to insure uninterrupted thread travel throughout the length of the device.

6. Apparatus for treating thread comprising a thread-advancing, thread-store device comprising a pair of spaced rotors supported from one end only thereof and along which the thread advances horizontally in the form of a single layer of traveling helices, one of said rollers being disposed on a horizontal axis and the axis of the other sloping downwardly in the direction of the unsupported end of the device, means to apply a plurality of thread-treating liquids to said sloping rotor, said sloping rotor having therein a plurality of annular grooves which divide it into spaced, axially aligned treating zones in registry with said means to apply treating liquids, and at least one of said zones having helical grooves in the surface of the rotor for propelling treating liquids counter to the direction of slope of the rotor, the thread moving downwardly on said sloping cylinder in the direction of the unsupported end of the unit and the annular grooves arresting the flow along said rotor, and means bridging the annular grooves to insure uninterrupted thread travel throughout the length of the device.

7. Apparatus for treating thread comprising a thread-advancing, thread-store device comprising a pair of spaced rotors for advancing thread horizontally therealong in the form of a single layer of traveling helices, means for applying a plurality of thread-treating liquids to at least one of said rotors, at least one zone of each rotor to which liquid is applied having helically disposed grooves therein to propel the liquid longitudinally thereof, said rotor having annular grooves therein at the end of each such zone to arrest the longitudinal flow of liquid along said rotor, and means bridging the annular grooves to insure uninterrupted thread travel throughout the length of the device.

8. Apparatus for treating thread comprising a thread-advancing, thread-store device comprising a pair of spaced generally cylindrical rotors for advancing thread horizontally therealong in the form of a single layer of traveling helices, means to apply a plurality of thread treating liquids to at least one of said rotors, at least one zone of each rotor to which liquid is applied having a plurality of circumferentially spaced, helical grooves therein, each groove including a flared portion for leading a treating liquid from the plane of the groove to the plane of the rotor surface proper, whereby, upon rotation of the cylinders, the liquid applied will be moved axially by the grooves and distributed circumferentially by the flared portions thereof, said rotor having annular grooves therein at the end of each such zone to arrest the flow of liquid along said rotor, and means bridging the annular grooves to insure uninterrupted thread travel throughout the length of the device.

9. Apparatus for treating thread comprising a thread-advancing, thread-store device comprising a pair of spaced, generally cylindrical rotors for advancing thread horizontally therealong in the form of a single layer of traveling helices, and means to apply a plurality of thread treating liquids to at least one of said rotors, at least one zone of each rotor to which liquid is applied having a plurality of helical grooves therein arranged in axially and circumferentially spaced relation in a helical pattern, said grooves causing the liquid applied to the rotor to flow longitudinally thereof, said rotor having annular grooves therein at the end of each such zone to arrest the flow of liquid along said rotor, and means bridging the annular grooves to insure uninterrupted thread travel throughout the length of the device.

10. Apparatus for treating thread comprising a thread-advancing, thread-store device comprising a pair of spaced, generally cylindrical rotors for advancing thread horizontally therealong in the form of a single layer of traveling helices, and means to apply a plurality of thread treating liquids to at least one of said rotors, at least one zone of each rotor to which liquid is applied having a plurality of helical grooves therein arranged in axially and circumferentially spaced relation in a helical pattern, some of said grooves having a flared portion extending for less than the full groove length, each flared portion leading in a gentle slope from the bottom of the respective groove to the plane of the rotor surface proper and lying in circumferential alignment with the unflared portion of a groove which is adjacent in a direction counter to the direction of rotor movement, said rotor having annular grooves therein at the end of each such zone to arrest the flow of liquid along said rotor, and means bridging the grooves to insure uninterrupted thread travel throughout the length of the device.

11. Apparatus as claimed in claim 5 wherein at least one of said rotors is hollow and wherein means within the hollow rotor are provided for heating the same in a zone to which liquid is applied whereby to maintain the treating liquid at a controlled temperature while the thread passes therethrough.

HERBERT O. NAUMANN.

REFERENCES CITED

The following references are of record in the file of this patent:

UNITED STATES PATENTS

| Number | Name | Date |
|---|---|---|
| 2,002,994 | Hartmann et al. | May 28, 1935 |
| 1,983,221 | Furness | Dec. 4, 1934 |
| 2,020,057 | Hartmann | Nov. 5, 1935 |
| 2,129,274 | Hartmann | Sept. 6, 1938 |
| 1,375,629 | Colgin | Apr. 9, 1921 |
| 1,542,221 | Jarnette | June 16, 1925 |
| 2,319,812 | Gram | May 25, 1943 |